United States Patent [19]

McDonald et al.

[11] 4,172,214
[45] Oct. 23, 1979

[54] INTEGRATED MESSAGE ACCOUNTING SYSTEM

[75] Inventors: John C. McDonald, Los Gatos; James R. Baichtal, Los Altos, both of Calif.

[73] Assignee: TRW Inc., Los Angeles, Calif.

[21] Appl. No.: 781,348

[22] Filed: Mar. 25, 1977

[51] Int. Cl.² .................. H04Q 11/04; H04J 3/12; H04J 3/06
[52] U.S. Cl. ..................... 179/15 AQ; 179/15 BS
[58] Field of Search ........ 179/15 AQ, 15 AT, 15 BS, 179/15 BY

[56] References Cited
U.S. PATENT DOCUMENTS

| 3,629,846 | 12/1971 | Thompson | 179/15 AQ |
| 3,920,916 | 11/1975 | Brightman | 179/15 AQ |

Primary Examiner—David L. Stewart
Attorney, Agent, or Firm—Flehr, Hohbach, Test et al

[57] ABSTRACT

An integrated message accounting system for use in a telephone system operating in time frames each consisting of a plurality of time slots. The system includes line groups each having a number of primary and secondary input and output portions for receiving input data signals and transmitting output data signals where one or the other of the primary and secondary portions is activated for receiving and transmitting the input and output signals. The system also includes a second number of time slot interchangers for connecting the active input portions to the active output portions where one of the interchangers is activated for connecting the input portions to the output portions. The system also includes a system controller for activating the primary or secondary portions and one of the interchangers.

28 Claims, 13 Drawing Figures

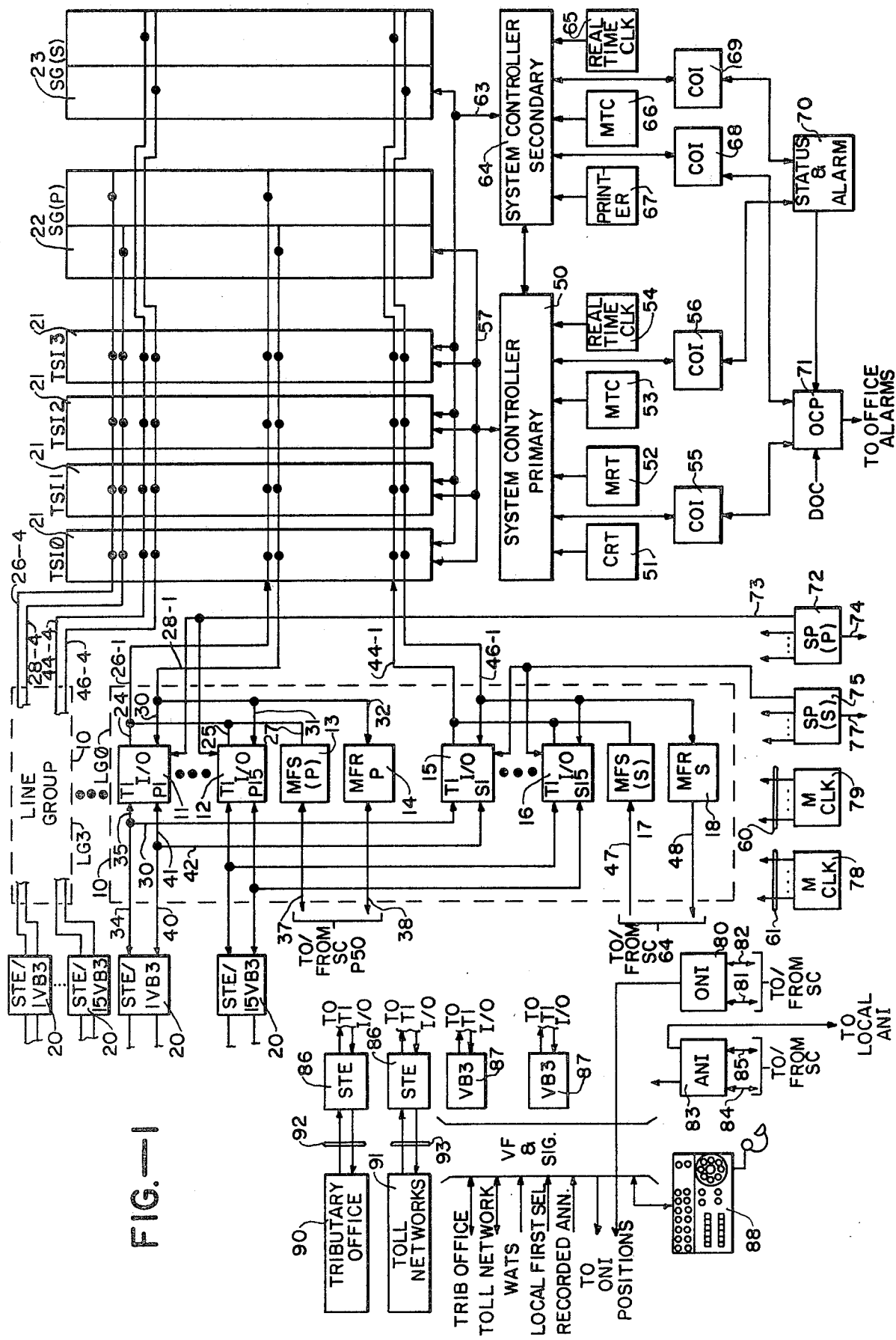
FIG.—1

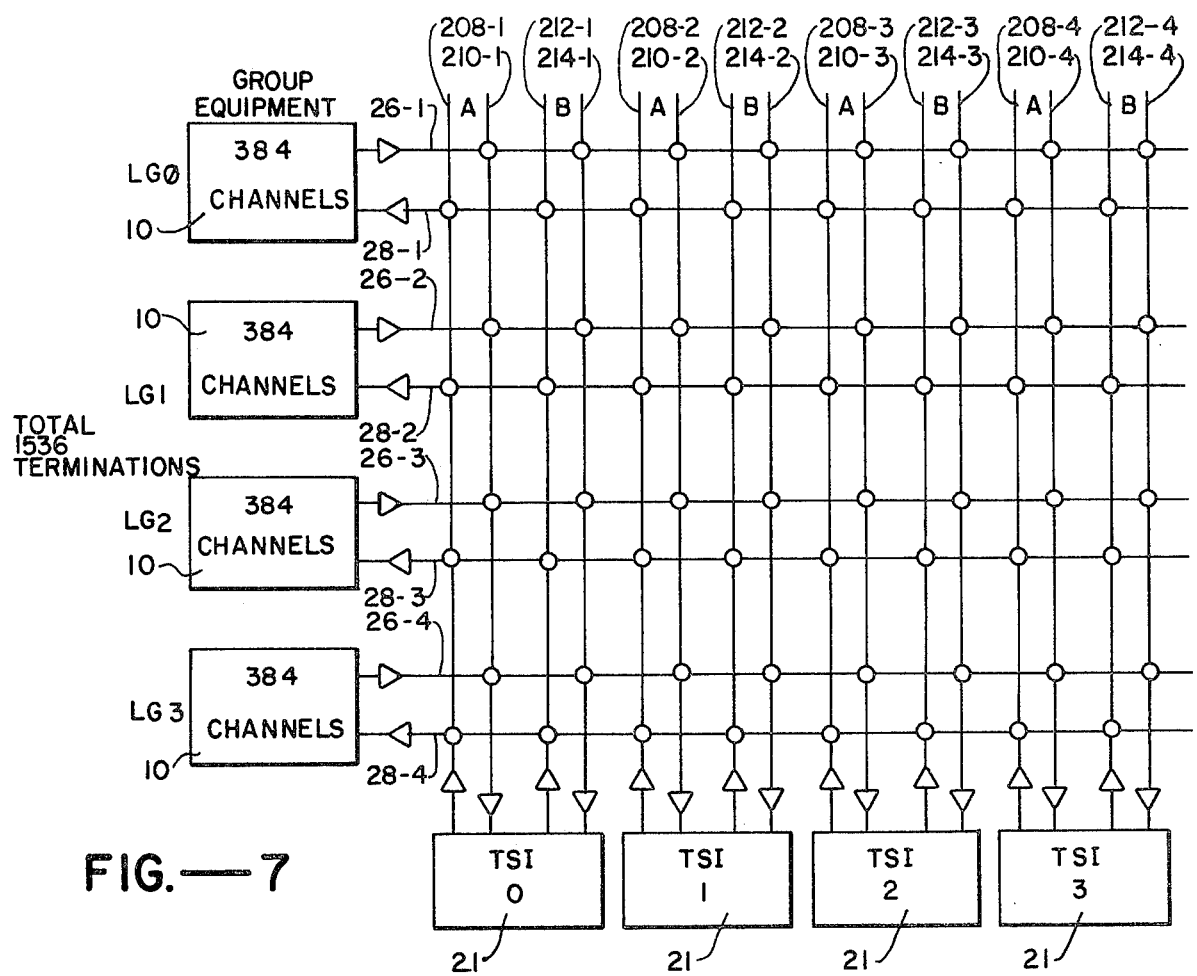
FIG.—7
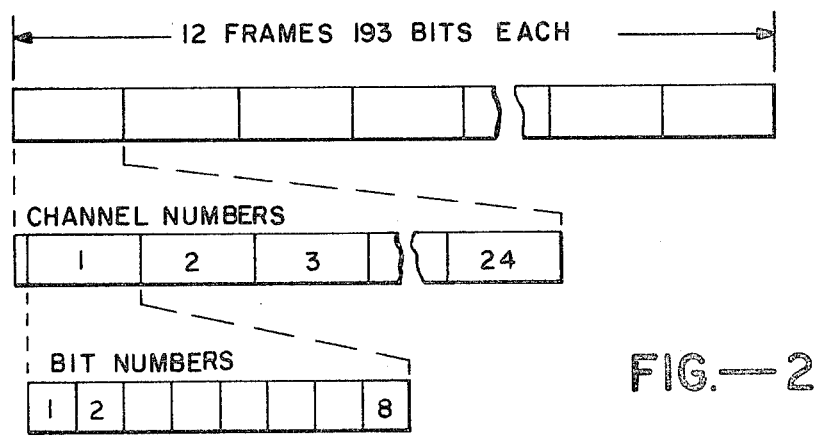
FIG.—2
| FRAME NUMBER | 1 | 2 | 3 | 4 | 5 | 6* | 7 | 8 | 9 | 10 | 11 | 12* |
|---|---|---|---|---|---|---|---|---|---|---|---|---|
| FRAME BIT | 1 | 0 | 0 | 0 | 1 | 1 | 0 | 1 | 1 | 1 | 0 | 0 |
FIG.—3

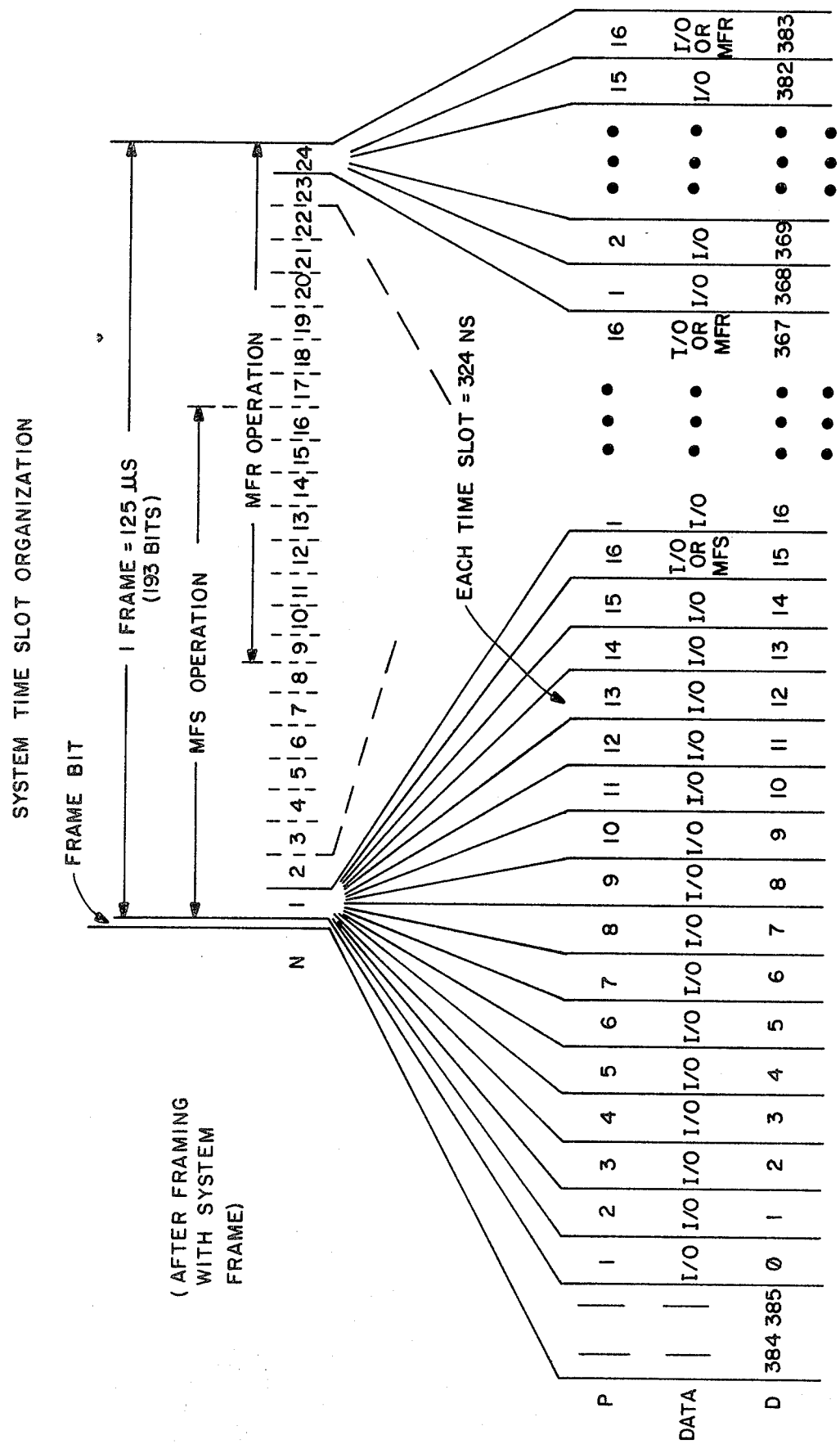
FIG.—4

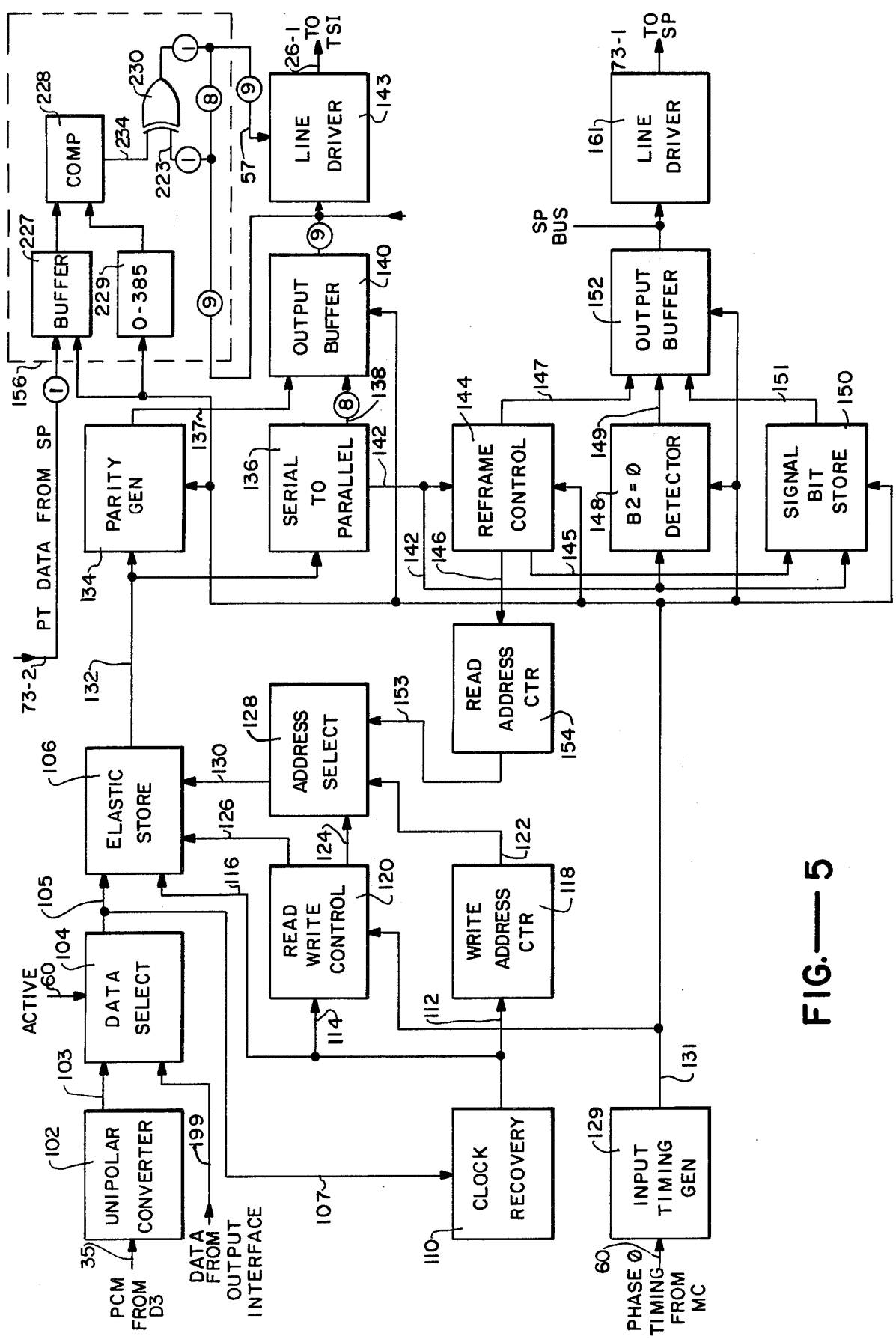
FIG.—5

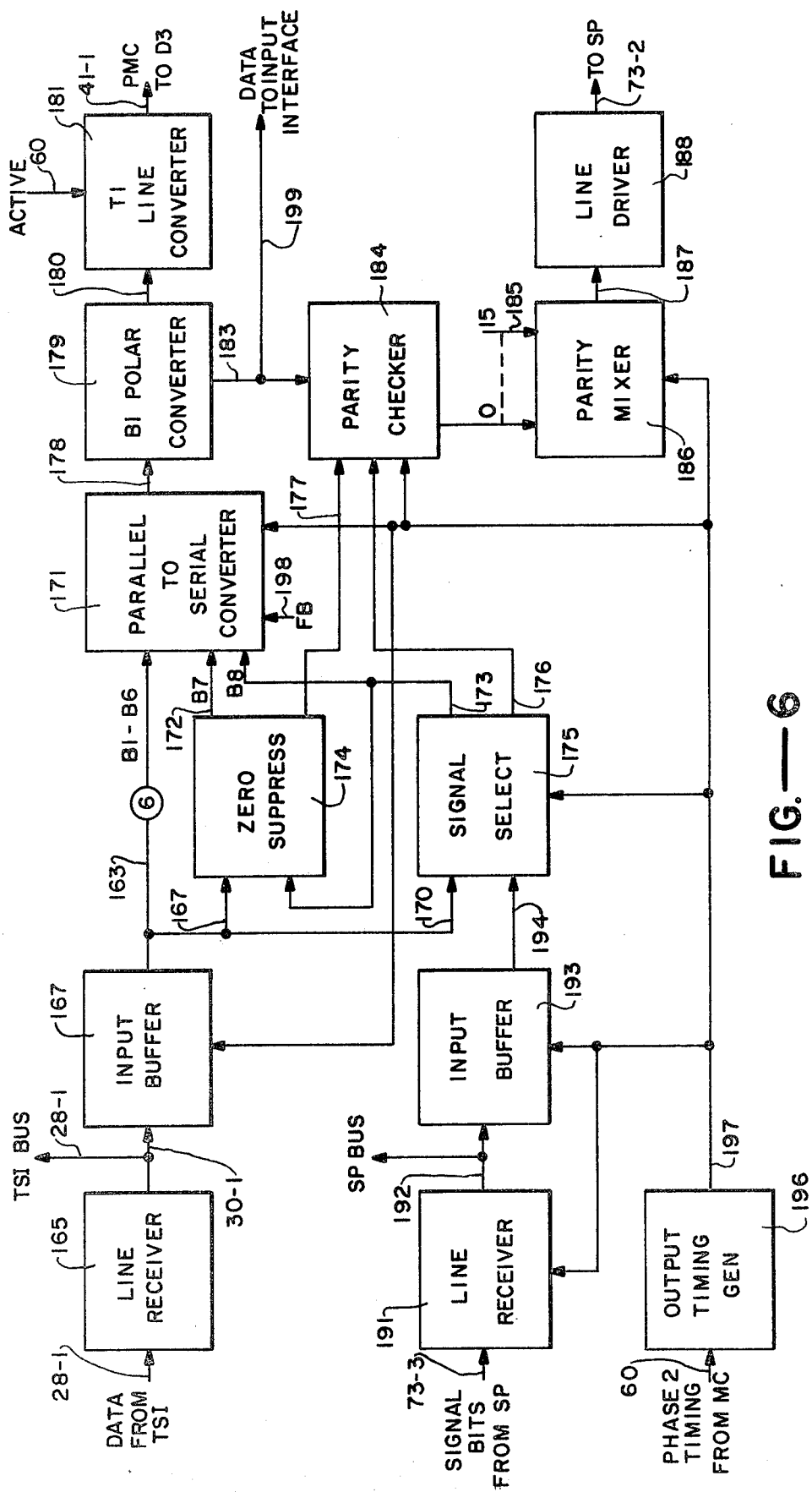
FIG.—6

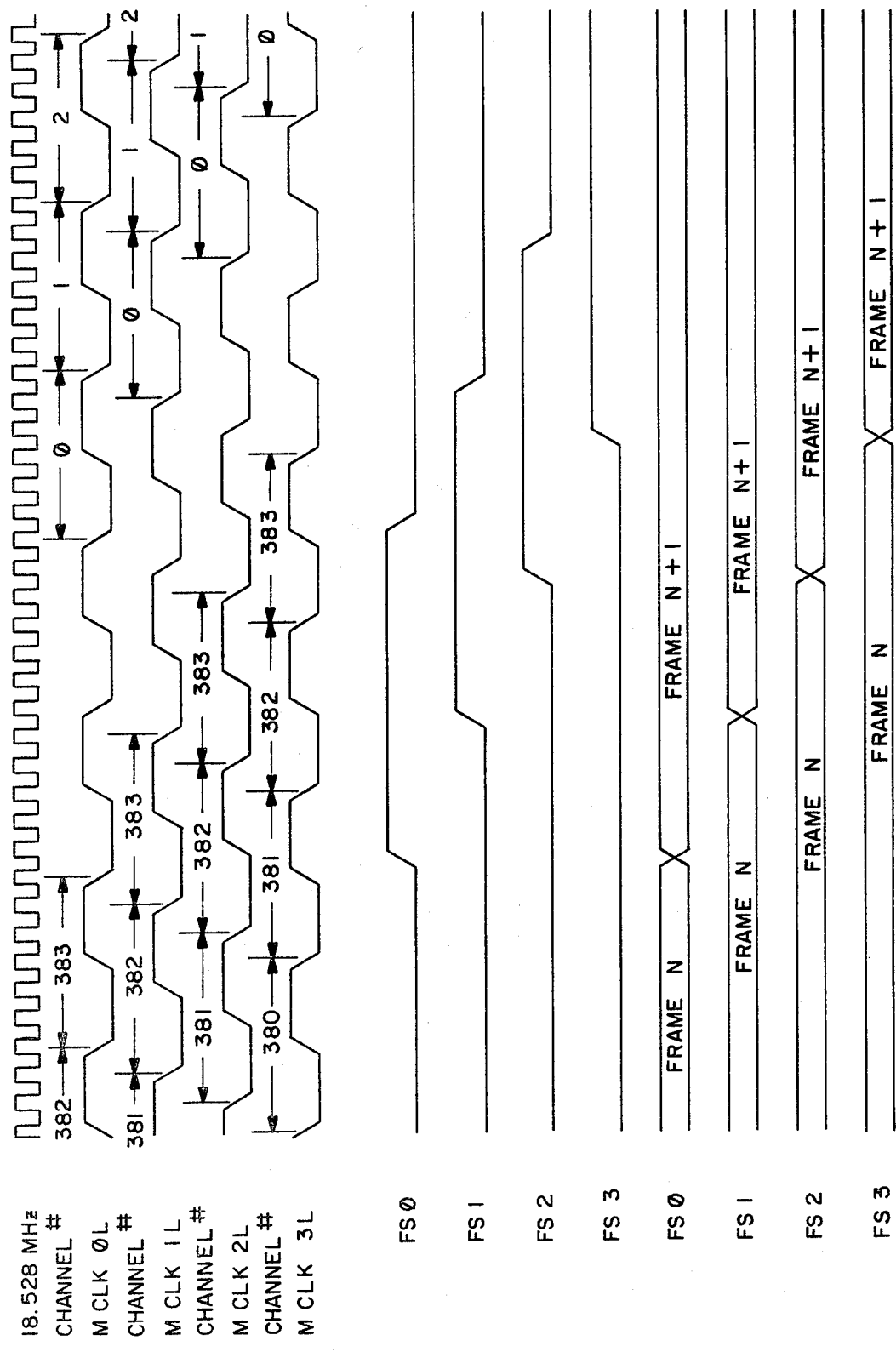
FIG.—8

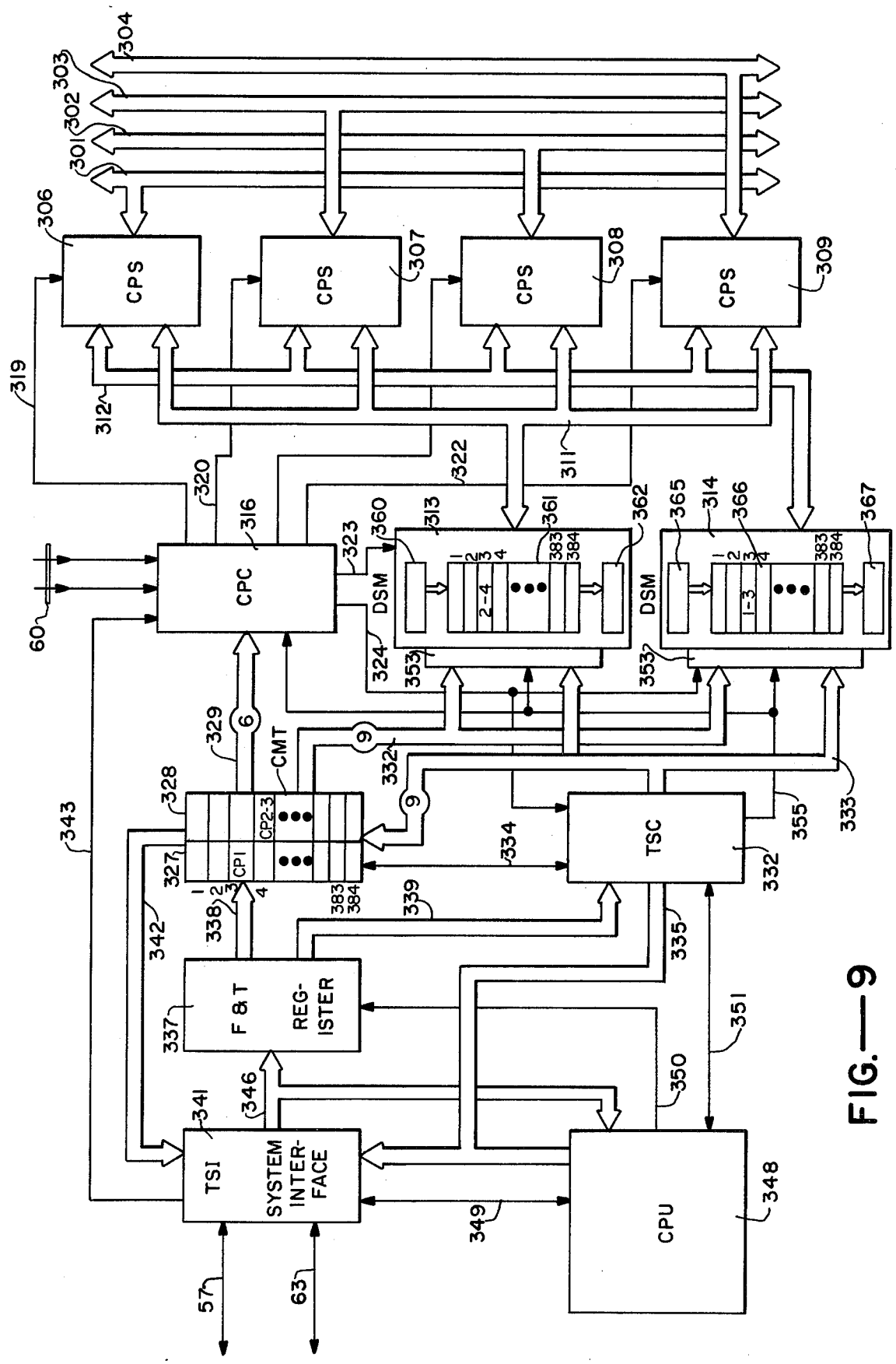
FIG.—9

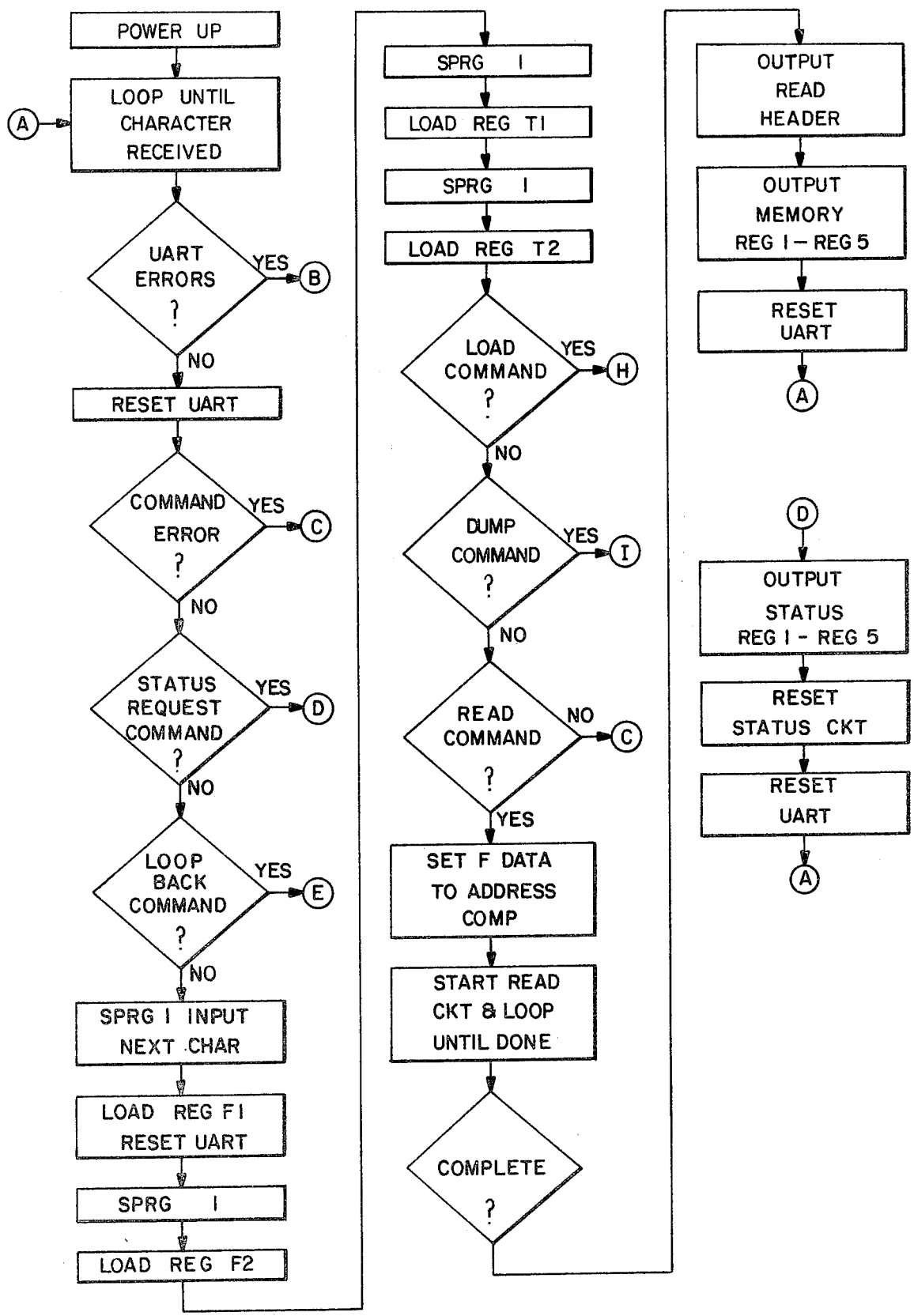
FIG.—10

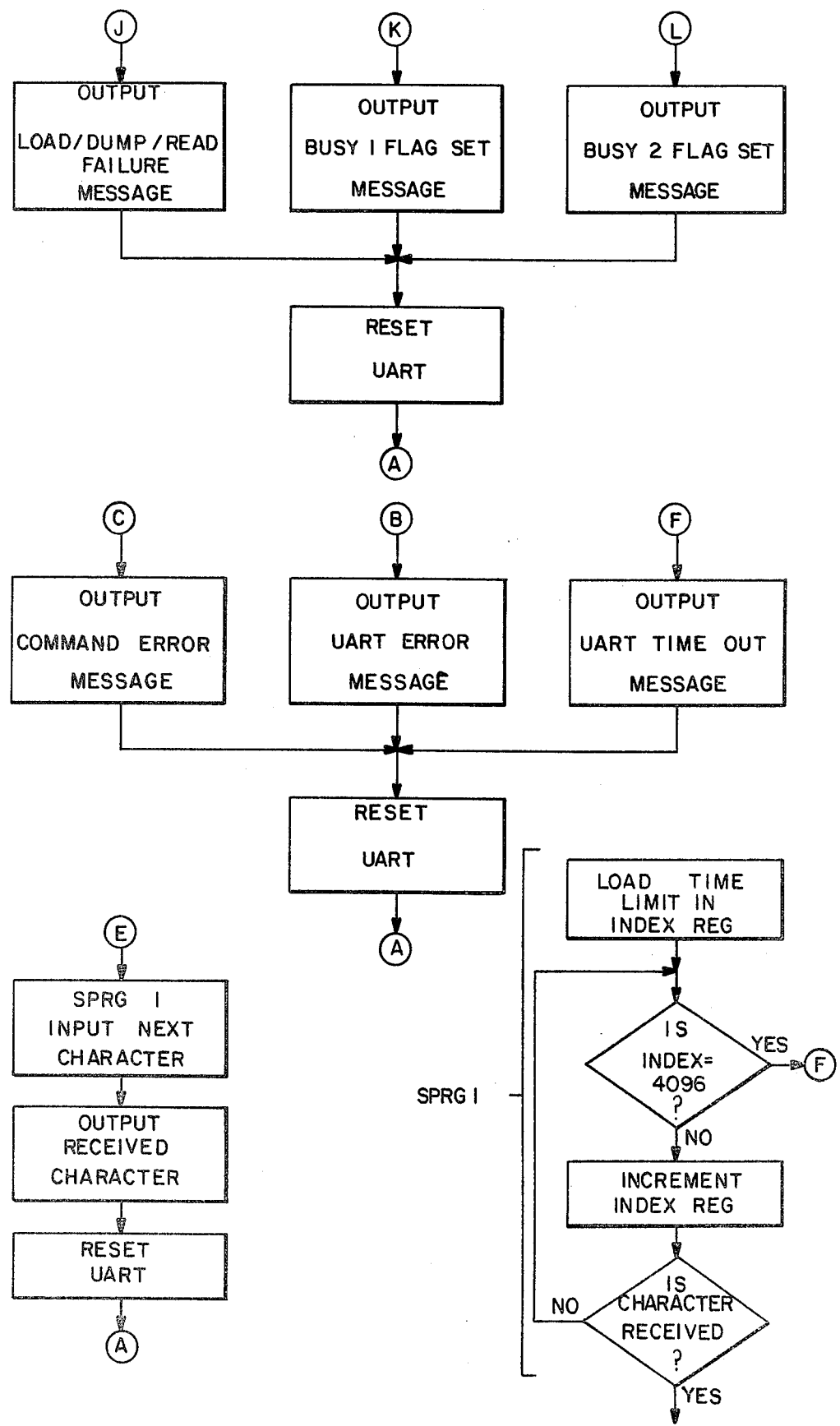
FIG.—11

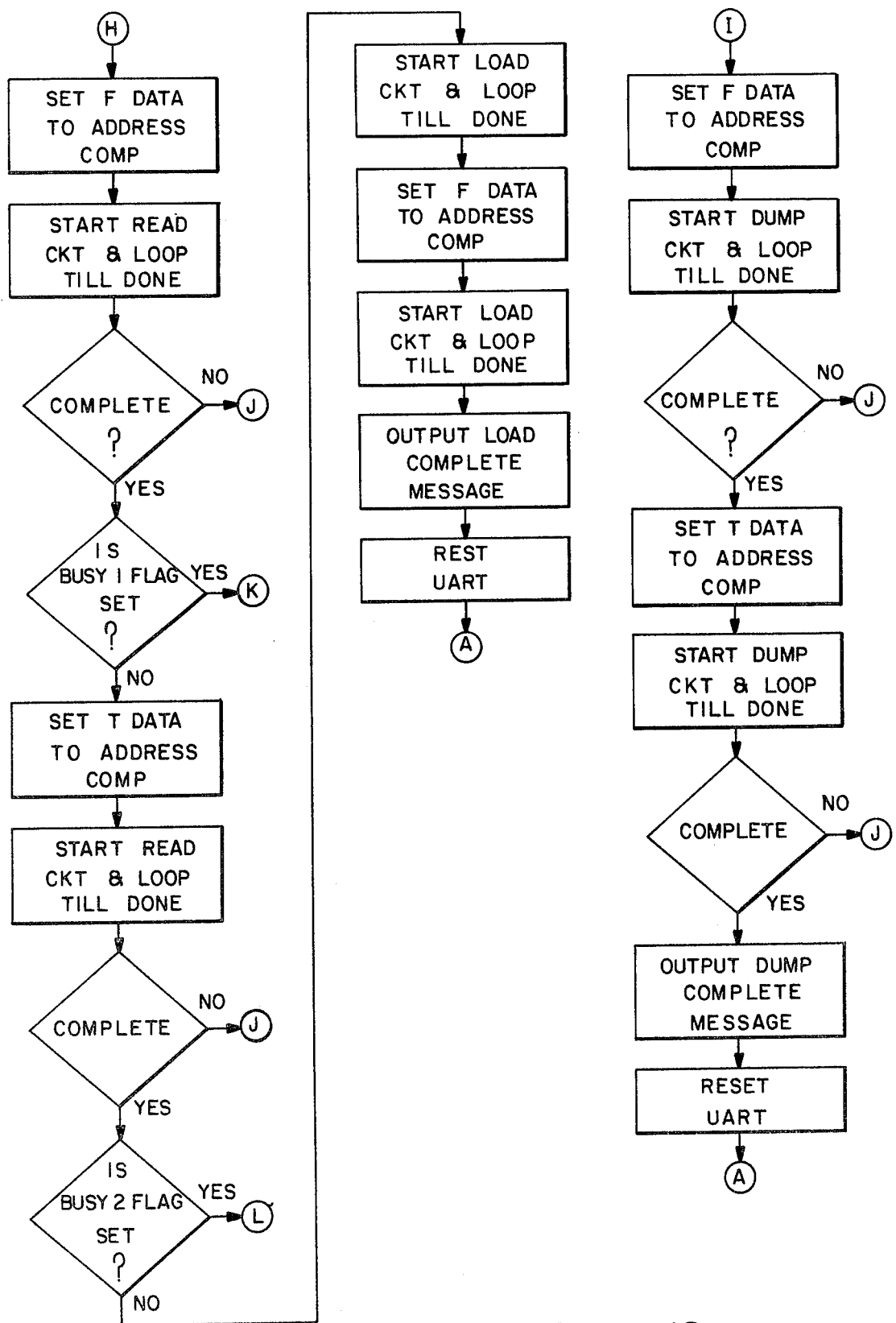
FIG. — 12

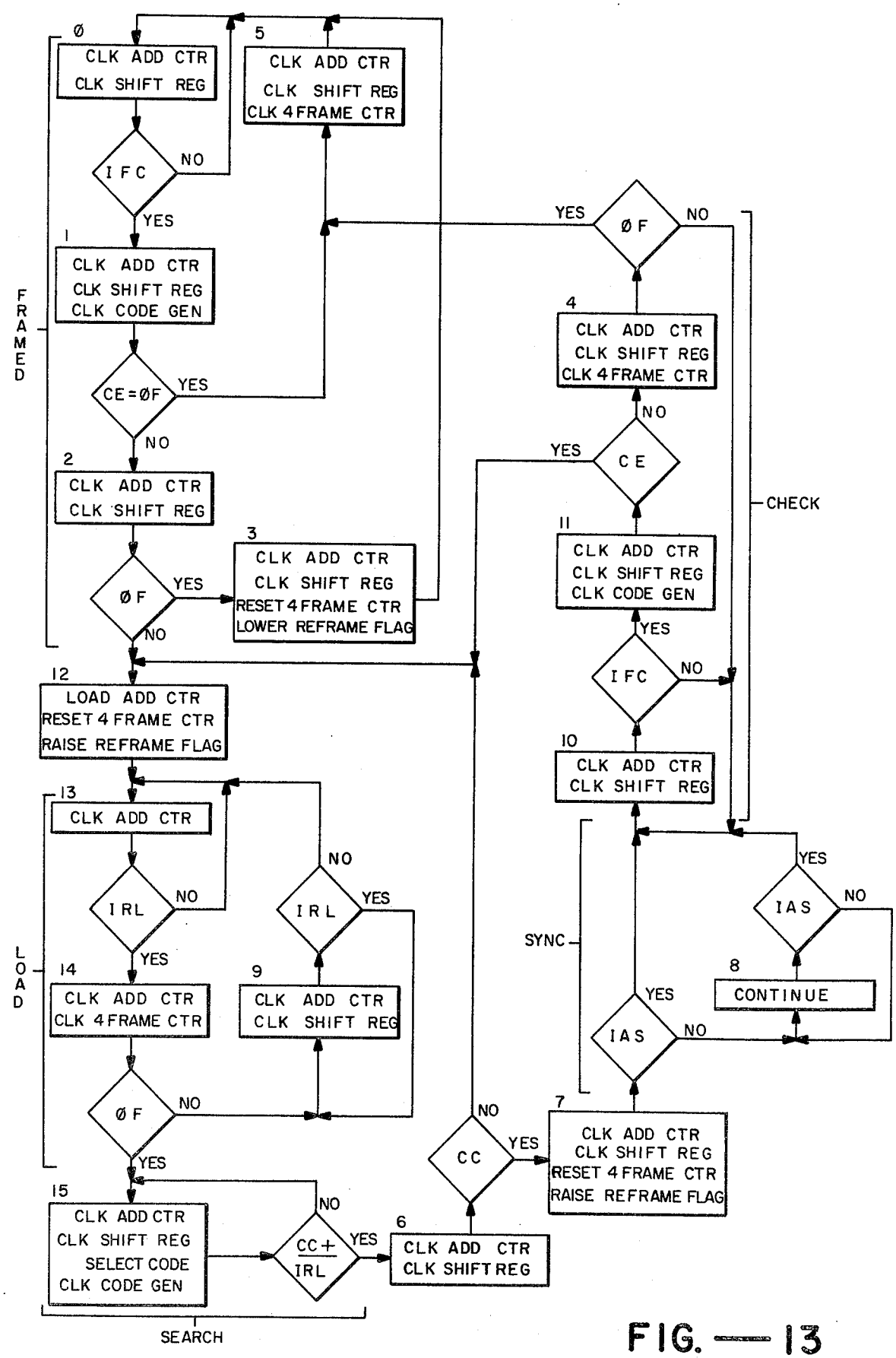
FIG.—13

INTEGRATED MESSAGE ACCOUNTING SYSTEM

CROSS REFERENCE TO RELATED APPLICATIONS

1. A TIME SLOT INTERCHANGER, Ser. No. 762,811, filed Jan. 26, 1977, now U.S. Pat. No. 4,071,703, issued Jan. 31, 1978, invented by Craig Schaffter and assigned to the same assignee of the present invention.

2. DATA PULSE REGISTER/SENDER FOR A TDM SWITCHING SYSTEM, Ser. No. 762,801, filed Jan. 26, 1977, invented by Johannes A. R. Moed and assigned to the same assignee of the present invention.

3. MULTIFREQUENCY SENDER/RECEIVER IN A MULTITIME SLOT DIGITAL DATA STREAM, Ser. No. 762,809, filed Jan. 26, 1978, invented by Bradley A. Helliwell and James R. Baichtal, and assigned to the same assignee of the present invention.

4. A DOUBLE REDUNDANT PROCESSOR, Ser. No. 781,437, filed Mar. 25, 1977, invented by John C. McDonald and James R. Baichtal, and assigned to the same assignee of the present invention.

5. SERVICE GENERATOR CHECKING APPARATUS, Ser. No. 762,808, filed Jan. 26, 1977, now U.S. Pat. No. 4,071,704, issued Jan. 31, 1978, invented by Johannes A. R. Moed, and assigned to the same assignee of the present invention.

6. PATH TEST APPARATUS AND METHOD, Ser. No. 762,934, filed Jan. 26, 1977, invented by James R. Baichtal and assigned to the same assignee of the present invention.

7. SERVICE GENERATOR FOR GENERATING A PLURALITY OF TONES, Ser. No. 762,810, filed Jan. 26, 1977, now U.S. Pat. No. 4,110,562, issued Aug. 29, 1978, invented by Johannes A. R. Moed and assigned to the same assignee of the present invention.

BACKGROUND OF THE INVENTION

The present invention relates to an integrated message accounting system for use in a telephone system operating in time frames each consisting of a plurality of time slots.

The use of pulse code modulated (PCM) digital signals in a telephone system enable a multiplicity of conversations to be translated over a two wire digitally multiplexed line commonly known as a T1 trunk line. A T1 trunk line is multiplexed with other T1 lines to form what is known as a line group. The multiplexed PCM data from the line group is then applied to a time slot interchanger for switching the data from one time slot of a line group to a time slot of another line group.

A message accounting system is employed for recording information resulting from toll, long distance and other types of telephone service. Such equipment requires the ability of the system to continuously process telephone calls in progress without disruption to service.

While the use of redundancy is well known for improving the reliability of any data transmission and storage system, redundancy techniques have not been previously employed in major subsystems of an integrated message accounting system to prevent a single point failure which could cause the system to go down.

There is a need for redundancy techniques in an integrated message accounting system where faulty subsystems could be switched automatically off-line to provide minimum interruption to service.

With the advent of microprocessors and electronic solid state design, it is desirable for major subsystems in an integrated message accounting system to utilize microprocessors thereby permitting the subsystems in the message accounting system to operate as independent entities.

In accordance with the above background, there is a need for an improved integrated message accounting system utilizing redundancy techniques and electronic solid state design for use in a telephone system utilizing PCM techniques.

SUMMARY OF THE INVENTION

The present invention relates to an integrated message accounting system operating in a multi-time frame format where each frame includes a plurality of time slots and each of the time frames include a framing bit for identifying each frame of the multi frame format. The system operates to switch data samples between a time slot on one communication line and a time slot on another communication line where the data samples occur as serial bits in the time slots at a predetermined rate.

The system includes line group means having a number of primary and secondary redundant input portions for receiving input data signals where one or the other of the primary and secondary input portions is activated for receiving the input signals.

The line group also includes a number of primary and secondary redundant output portions equal to the number of input portions for transmitting output signals where one or the other of the primary and secondary output portions is activated for transmitting the output signals.

The system also includes a second number of time slot interchangers for connecting the active input portions to the active output portions where one of the interchangers is activated for connecting the input portions to the output portions such that the input signals become output signals.

The system also includes a system controller for activating the primary or secondary portions and one of the interchangers.

In accordance with the above summary, the present invention achieves the objective of providing an improved integrated message accounting system for use in a telephone system operating in time frames each consisting of a plurality of time slots.

Additional objects and features of the invention will appear from the following description in which the preferred embodiments of the invention have been set forth in detail in conjunction with the drawings.

DESCRIPTION OF THE DRAWINGS

FIG. 1 is a block diagram of an integrated message accounting system in accordance with the present invention.

FIG. 2 is a representation of the time slot frame structure employed within a multiframe format.

FIG. 3 shows the frame bit code utilized by the integrated message accounting system of FIG. 1.

FIG. 4 shows the system time slot organization of the integrated message accounting system.

FIG. 5 shows a block diagram of a T1 input portion of the I/O interface of FIG. 1 which is a portion of the FIG. 1 system.

FIG. 6 shows a block diagram of a T1 output portion of the I/O interface of FIG. 1 which forms part of the FIG. 1 system.

FIG. 7 shows a block diagram of a digital switch which forms part of the FIG. 1 system.

FIG. 8 is a timing diagram for the system master clock of FIG. 1.

FIG. 9 shows a block diagram for the time slot interchanger, which forms a part of the FIG. 1 system.

FIGS. 10–12 show an exemplary flow chart for describing the operation of the processor which forms a part of FIG. 9.

FIG. 13 shows an exemplary flow chart for describing the operation of the reframe control circuit which forms a portion of FIG. 5.

DETAILED DESCRIPTION OF THE INVENTION

Referring to FIG. 1, the integrated message accounting system (IMAS) is seen in block diagram form. The IMAS can be used at class 4P toll points to process 1+ toll calls originating in class 5 offices, local calls, and other similar uses. It may be used as a LAMA (Local Automatic Message Accounting) system or as a CAMA (Centralized Automatic Message Accounting) system.

The basic functions of the IMAS are to provide recording of calls on magnetic tape, alternate routing for originating traffic, ONI operation, traffic monitoring reports, tandem routing for completing traffic, and WATS service (wide area telephone service). The subsystems of FIG. 1 utilize integrated circuitry forming modular hardware, thus providing electronic solid state reliability and long equipment life.

In FIG. 1, the span terminating equipment (STE) 86 is well-known equipment which functions to transmit, receive, terminate, monitor status of, or loop back the PCM bit streams of T1 lines used as digital trunks in connection with the IMAS.

The VB3 voice bank 87 is well-known equipment which provides time division multiplexing-demultiplexing, PCM encoding-decoding and terminal failure group alarm functions between 24 telephone circuits (VF and signaling) and a 1.544 MB/S bipolar pulse stream in D3 format. As seen in FIG. 1, VB3 87 provides appropriate interfacing with tributary offices, toll network, WATS service, recorded announcements, local first selectors, and Operator Number Identification (ONI) positions. The pulse stream is applied to a T1 input/output interface in the IMAS digital switch. Individual trunks (channel units) are chosen and configured appropriately for each application.

In FIG. 2, the PCM data format in the STE and VB3 equipment is compatible with the American Telephone and Telegraph Company's D3 channel bank, the operation of which is well known. With a sampling frequency of 8,000 Hz for encoding PCM data, one timing frame equals 125 microseconds with 24 time slots per frame per T1 line. Each channel of information is in the form of 8 bit channel words. A framing bit is added every 24 channels to form and define a frame. Each frame of 125 microseconds equals one frame bit plus the 24 time slots of 8 bits each and therefore there are 193 bits per frame for a D3 channel bank.

In FIG. 3, the frame bit occurs once at the start of each frame. It contains a framing code that takes 12 frames to repeat.

In each time slot there is an 8 bit speech code to digitally represent a quantized value of a particular portion of an analog signal. Once each six frames the eighth bit of each time slot carries a signaling bit to indicate on-hook or off-hook status of that particular channel or time slot.

In PCM systems like that of FIG. 1, quantizing a message signal by certain discrete levels or steps inherently introduces an initial error in the amplitude of the samples, giving rise to quantization noise. Quantization noise can be reduced by the use of nonuniform spacing of levels, to provide smaller steps for weaker signals and coarser quantization near the peak of large signals. The $\mu$-255 companding law utilizes this concept of encoding PCM data in which the coding magnitude range is divided into 8 segments, and 16 levels are equally spaced within each of the 8 segments. From one segment to the next higher, the level spacing (step size) increases by a factor of 2. In the 8 bit code word representing any sample, the first bit gives the sign, the next 3 bits describe which of the 8 segments contain the sample, and the last 4 bits specify the nearest of the 16 possible levels within the segment.

In FIG. 1, the unit 20 is either a STE 86 or a VB3 87 unit as previously described. Data from STE/VB3 unit 20 is applied to both the primary and secondary interfaces of a line group 10. For example, data is input to T1 I/O primary interface 11 and the secondary I/O interface 15 via buses 34, 35, and 34, 36, respectively. Data is output from T1 I/O interfaces 11, 15 to STE/VB3 unit 20 via buses 41, 40 and 42, 40, respectively.

As seen in FIG. 1, primary and secondary interface redundancy is employed in all major subsystems in the IMAS to prevent a single point failure which could cause the system to go down. Faulty subsystems are automaticaly switched off line to provide minimum interruption to service.

A line group 10 interfaces any T1 line pair such as lines 34 and 40 with four Time slot Interchangers (TSI) 21 designated TSI $\phi$-3. A primary T1 I/O Interface also interfaces the optional primary multifrequency sender (MFS) 13 and receiver (MFR) 14 with the TSI 21. A primary T1 I/O interface such as interface 11 accepts bipolar PCM data from a T1 line (34, 40) carrying information in D3 format (standard D3 decode transfer characteristic). A secondary (redundant) T1 I/O Interface such as Interface 15 also interfaces any T1 line pair such as lines 34, 40 with the TSI 21. Interface 15 also interfaces the secondary MFS 17 and MFR 14 with TSI 21.

Incoming data from a unit 20 is stored and synchronized by the I/O Interface such as interface 11 to the IMAS system frame. Data is converted by each I/O interface to 9 bit parallel (includes parity bit) and sent to the time slot interchanger (TSI) 21. Carrier group alarm (CGA) detection (B2=0) and signal bit recovery (Bit 8 of 6th and 12th frames) is also accomplished. Error signals and signal bits are sent to the primary signal processor (SP) 72 or secondary SP 75 for further analysis.

It is possible to operate 16 of these T1 I/O interfaces for each primary and secondary subsystem per line group. Each I/O interface accommodates one T1 line or one VB3 voice bank. Up to four line groups per system may be used. Further discussions of the various primary and secondary subsystems will be limited to the primary subsystem, although it will be understood that the discussion would apply with equal effect to the secondary subsystem.

A line group organizes the voice frequency data from 16 T1 lines or 15 T1 lines and the MFS onto a 384 time slot data bus to the TSI's (TSI$\phi$-TSI3).

Referring to FIG. 4, one frame is equivalent to 125 microseconds or 193 bits. The frames recur at the 8 KHz sampling frequency. There are 24 D3 channel numbers as indicated by N, and there are a total of 384 time slots of 324 nanoseconds each, with an additional two time slots for the frame bit. FIG. 4 shows how time slots are organized with respect to the incoming frame. The first 16 time slots are constructed of data from channel one of the 16 incoming frames. The next 16 times are from channel 2 and so on. Each T1 I/O interface is allocated to one of 16 time slots for each D3 channel. 16 T1 lines are each input to the respective T1 line I/O interface and multiplexed to time slots 0–15. P indicates the particular line group interface accessed during a channel number. For example, during channel number one, P1 would indicate primary I/O interface 11 and secondary I/O interface 15 of FIG. 1 is accessed. P15 would indicate primary I/O interface 12 and secondary I/O interface 16 are accessed. P16 would indicate primary multifrequency sender 13 and secondary sender 17 of FIG. 1 are accessed. If the line group did not employ a multifrequency sender and receiver, P16 would indicate accessing another I/O interface. During channel 24, P16 would indicate the primary MF receiver 14 and secondary MF receiver 18 are accessed. The D of FIG. 4 indicates the decimal time slot for the line group from 0–385. D3 channels 1–8 are assigned to the MF sender. D3 channels 17–24 are assigned to the MF receiver and D3 channels 9–16 are assigned to either MFS or MFR, dependent upon traffic conditions.

In FIG 1, the IMAS digital switch comprises line groups 0–3 and TSI 0–3.

Referring to FIG. 1, the TSI 0–3 switch channel time slot data from any of the four line groups to any other channel time slot of any other of the four line groups. For example, data from line group 0 could be sent via bus 26-1 to TSI 0 and switched out bus 28-4 to line group 3. The TSI's receive channel time slot data (8 bits plus parity). When it is available from the line group data bus, the TSI's hold it until the proper time for output in the next frame and transmit the data to the line group data for output. The TSI contains control and data memory for all time slots. The TSI's communicate with both the primary and secondary system controllers (SC) 50, 64 via bus 57, 63. Further details of the digital switch are described in the above-referenced application entitled "Time Slot Interchanger".

In FIG. 1, the primary and secondary service generators (SG) 22, 23 provide capability to connect one of several standard tones in PCM format to any of the channel time slots. These tones include 1,000 Hz, 120 IPM busy, 60 IPM busy, dial tone, ring back tone and internal tones for the IMAS. The primary and secondary SC 22, 23 receive control signals from the respective system controller (SC) 50, 64. Further details of the service generator are described in the above referenced application entitled "Service Generator For Generating A Plurality Of Tones".

The primary and secondary signal processors (SP) 72, 75 monitor all the input channels of the IMAS for changes of state and dial digits. Each time a channel is seized or released, or a digit is dialed, a message is sent to the respective SC 50, 64 via buses 74, 77, containing the channel number and the event. All the information needed to determine the changes of state or dial digits is time division multiplexed over several leads originating from the line group.

The SP 72, 75 also have the capability to seize or release channels or dial digits on these channels. Frames 6 and 12 are signaling frames. During these frames, the least significant bit of the 8 bit PCM byte is replaced with a signaling bit. Frame 6 is used for an A signaling bit and frame 12 is used for a B signaling bit. The signal processor uses the A signaling bit for seizure, release and dial digit detection. The B signaling bit is used for state change detection only. Further details of the signal processor are described in the abovereferenced application entitled "Register/Sender".

In FIG. 1, the primary and secondary system Master Clock 79, 78 is a conventional device for generating all basic clock signals used by the IMAS. The clock generates 4 clock signals MCLK$\phi$-MCLK3 all of which are 3.088 MHz square waves, but each one is phase shifted by 270 ns nominal. The purpose of this phase shifting is to allow for propagation delay of data as it is routed through the different subsystems contained in the IMAS.

Referring to FIG. 8, the basic frequency of the system master clock is a crystal generated 18.528 MHz. The basic frequency of the system master clock is divided down to the 3.088 MHz square wave.

Master frame pulses FS$\phi$-FS3 generate a 648 ns pulse every 125 us and are used to mark the start of a new frame. FS$\phi$-FS3 are primarily used by subsystems to synchronize their address generators.

The master frame bit signal FB$\phi$-FB3 generates a repeating pattern of serial bits. The pattern repeats every 12 frames and the bits can be decoded to identify each of the 12 frames as seen in FIG. 3.

Again referring to FIG. 1, in addition to the clock signals of FIG. 8 originating from the master clock, an "Active" signal originates from the system controller 50, 64 of FIG. 1 to inform some of the IMAS subsystems that they are on line.

Should a single point failure occur somewhere in the primary system, the primary system controller 50 will inactivate the on-line system by inactivating the "Active" signal. The off-line system will go on-line by the secondary system controller 64 activating the secondary master clock 78, thereby switching the secondary (redundant) system on-line to process data.

In FIG. 1 the operator number identification subsystem (ONI 80) provides a control interface between the IMAS and ONI operator positions for serving lines not equipped with automatic number identification (ANI) or for calls experiencing ANI failure.

The MF senders (MFS) 13, 17 generate and output MF tone pairs onto the line group data bus 26-1, 44-1 for switching through the time slot interchangers 21 to an outgoing path such as 28-4, 46-4. The MFS 13, 17 communicate directly with system controllers 50, 64 via buses 37, 47, respectively. The MF receivers (MFR) 14, 18 detect MF tones in PCM digital input form and send them to the SC 50, 64 via buses 38, 48, respectively.

The MFS and MFR jointly share one group of 24 D3 time slots and associated control facilities. A minimum of 8 time slots and a maximum of 16 time slots for each sender such as MFS 13 and each receiver such as MFR 14 are available to traffic at any time subject to a total maximum of 24 time slots. Systems with more than one line group may be equipped with the above capacity per line group as required by traffic.

The operation of the MF sender will be described briefly. When a calling party has dialed a called party, the SC choses an outgoing trunk group and an idle outgoing trunk is selected. The digital switch consisting of the line group and TSI paths is set up and path tested between the selected MFS channel and the selected outgoing trunk and the MF sender is commanded by the SC to outpulse onto the TSI Bus.

Referring to FIG. 4, the 24 channel times of a D3 frame are used by the MFS as follows: the first 16 channel times are reserved for outputting tone bursts on MFS channel numbers 1 through 16, respectively. The last 8 are reserved for processing commands from the SC. Depending upon traffic conditions, the SC can assign DC channel numbers 9–16 to any combination of the MF Sender and MF Receiver.

The multifrequency pulsing (MF) system consists of transmitting and receiving equipment for transferring valid number information over telephone trunks by various combinations of two, and only two, of five frequencies in the voice band. Each combination of two frequencies represents a digit. The digits are digitally encoded into PCM code for transmission along a T1 line for switching through a digital switch. MF receivers detect the digits and transfer the digital information to control equipment which establishes connection through the switches. MF pulsing is also used to transmit calling number information in CAMA-ANI (centralized automatic message accounting—automatic number identification) operation. In this case, the calling number is MF pulsed forward in PCM digital format from the originating office to the CAMA office following the forwarding of a called number whether the called number is transmitted in MF or dial pulsing.

Referring now to FIG. 2, the 24 channel times of a D3 frame are used as follows for the MF receiver: the first 3 channel times are ignored except for parity checking. The last 16 are used as multifrequency receiver (MFR) channel numbers 1 through 16, respectively. In the timing figure, the MFR channel members are allotted to time slots 143, 159, 175, . . . 351, 367, 383. Time slots 143, 159, 175, 191, 207, 223, 239 and 255 are shared between the MFS and the MFR. The system controller (SC) has the option of assigning any one of the middle 8 channel times of the D3 frame (time slots 143, 159, . . . 255) to the MFS or MFR (but not both). Therefore, the maximum number of senders and receivers that can be used at any one time ranges from 8 senders and 16 receivers to 16 senders and 8 receivers. The particular combination of MFS and MFR during the D3 frame would be dependent upon traffic conditions.

The operation of the MFR will now be briefly described, assuming a calling party has initiated a 1+ DDD call in which the SC initiates calling number identification by activating the CAMA-ANI subsystem. The SC assigns the MFR to a time slot in the D3 frame corresponding to the time slot occupied by the 1+ originating trunk. The calling number information in CAMA-ANI pulsing format will consist of a KP signal (MF frequencies 1100+1700) which is a preparatory signal for digits; an information digit "I" meaning the automatic identification of the calling number has been done in the originating office; the 7 digit calling number in MF format; and the ST signal (MF signals at 1500+1700 Hz), signifying end of the pulsing sequence. Further details of the MF sender and receiver are described in the above-identified application entitled "Multifrequency Sender/Receiver in a Multitime Slot Digital Data Stream".

The primary and secondary system controllers (SC) 50, 64 are Intel 8080A stored program microprocessors surrounded by a number of peripheral devices and interfaced to each subsystem. For further details of interconnections between the Intel microprocessor and associated peripheral devices, see the Intel 8080 Systems Users Manual.

The System Controllers 50, 64 provide the following functions:

(1) call processing including routing, ANI (Automatic Number Identification), ONI, recorded announcement control and creation of billing records;

(2) SC self test; and (3) system test and maintenance data outputs for accumulation of traffic monitoring data and generation of traffic monitoring reports. The secondary (redundant) SC 64 is updated continuously so that it can assume control of the system with a minimum disruption to service should primary SC 50 experience a failure.

To enable the secondary system controller to come on line and start processing calls should the primary system controller experience a failure, portions of the memory containing the states of all calls in progress are periodically copied into the memory of the secondary system controller through direct memory access techniques which are well known in the art. Also, hard copies of messages that are displayed on the CRT are output via the teletype by the secondary system controller.

When the secondary system controller is on line and processing calls, the call records are stored in its cartridge until the primary system is back on line for the reason that the secondary system controller is not equipped with a MTR. At that time, the call records are read from the cartridge into the secondary system controller, transferred to the primary controller and dumped onto tape in the MTR.

Each system controller is equipped with 64 K bits of memory addressable by a 16 bit address bus. Further details of the operation of the Intel 8080 microprocessor are described in the Intel 8080 System User's Manual.

The panel interface is equipped with display light emitting dials and control switches to take the place normal front panel in a computer, allowing some manual control of the operation and selectively displaying the data or address.

The alarm monitor monitors all alarm signals from the primary system controller as well as active and alarm lines of the other system controller, and in addition supplies a 10 MS interrupt to the central processing unit.

The peripheral devices connected to the System Controllers 50, 64 are as follows:

The CRT 51 which is used for:

a. Primary system information display (e.g., traffic, alarms, maintenance program results)

b. Keyboard entry of system control commands and data (e.g., translation table data, trunk-type assignments, test trunk control, and system diagnostic control)

The CRT 51 is the primary system interface to office personnel.

Printer 67: provides printed output records of traffic, alarms, maintenance diagnostics and other system data. In the event of CRT 51 maintenance of failure, the printer may be used as a substitute input-output device.

MTR 52—The magnetic tape recorder is the primary system billing recording device. The MTR 52 records can be read by a similar industry standard MTR in an EDP data center.

MTC 53—A magnetic tape cartridge recorder is associated with each SC, primary and secondary. The MTCs are used to load standard programs and office data from tape cartridges. Additionally, the secondary MTC is used as a backup recording device when the MTR is not in service.

RTC 54, 65—The Real-Time Clock generates the stable time bases for timing all programs in each SC 50, 64.

COI 55, 56, 68, 69—Control Office Interfaces are used to interface signals in and out of the CO (e.g., Dynamic Overload Control Signals—DOC).

Office Connection Panel 71—the OCP contains terminal blocks for connection of the system to office alarms, DOC and other office signals as required.

Status and Alarm Panel 70—the SAP provides basic system status and alarm display and allows limited, direct control of essential functions. It communicates with the SC via COIs.

Test Trunk Panel 88—the TTP provides jackfields and access to voice and signaling of two 4-wire trunks assigned as system test trunks. Pushbutton switches on the panel allow for talking, dialing and testing on each trunk, for patching together the two test trunks and for momentary monitoring of a call in progress.

ANI Adapter 83 (optional)—provides interface facilities between standard local identifiers and the IMAS SC and VB3 trunks.

An example of a call processing overview of the IMAS will be given to provide a better understanding of the operation of the present invention. The overview will be given in conjunction with FIG. 1 and assumes that the primary portion of the IMAS is on-line. The secondary portion of the IMAS is off-line but would automatically be switched on-line should the primary portion experience a failure. Therefore, the description of the call processing overview as it applies to the primary portion of the IMAS will apply with equal effect to the secondary portion.

Call Overview

Referring to FIG. 1, a subscriber in a tributary office 90 goes off hook, receives a dial tone from the local office and dials "1" to initiate a 1+ direct distance dialing (DDD) call. This causes a 1+ toll connecting trunk 92 to the IMAS to be seized (go off hook) at the tributary office 90. The seizure is passed into the IMAS through STE/VB3 unit 20 as a change of state of a signaling bit on a T1 line such as 34, 40 entering a T1 I/O interface such as interface 11. The seizure is recognized by the signal processor 72 which passes the change in trunk state to the system controller (SC) 50. The Controller 50 begins a process of building up a Call Processing Record. As the subscriber dials a called number, the signal processor (SP) 72 detects each dialed digit and forwards it to the SC 50 for storage in memory.

At the appropriate time, the Controller 50 signals the tributary office 90 via the SP 72 to initiate calling number identification. The tributary identifier in the tributary office 90 is activated, the SC 50 connects an MF receiver (by assigning the MFR 14 to a time slot corresponding to the time slot occupied by the 1+ originating trunk 92) and the Calling number information is passed to the MFR 14. The MFR 14 forwards each digit received to the SC 50 where this information is assembled in memory with called number and other information necessary to form a complete record for eventual use as a billing record.

With called number information in the memory of the SC 50, the controller 50 proceeds to perform a translation (3 digits or 6 digits are required). An outgoing trunk group connected to Toll Network 91 is chosen and an idle outgoing trunk such as trunk 93 is selected. The digital switch (consisting of line group 10 and time slot interchanger 21 paths) is set up and path tested for path continuity. The MF sender 13 is commanded by the SC 50 to out pulse an MF tone. Alternatively, dial pulse sending (DP) is also possible using the SP 72.

The SP 72 monitors the state of the outgoing trunk 93 after outpulsing and initiates call timing in the SC 50 at answer supervision by using the real time clock 54 associated with the SC 50. The SP 72 continues to monitor the state of the outgoing trunk signaling until the call is terminated. At this point, the SP 72 informs the SC 50 that the subscriber associated with the tributary office 90 went back on hook. The SC 50 then assembles a billing record in its output memory buffer area. When a block of 16 billing records is present in the buffer area, it is written on the output magnetic tape recorder (MTR) 52.

The information contained in a call record is: the date; connecting time; elapsed time in minutes and seconds; originating number; terminating number; type code; class code; information code; time and charge code; trouble code; CPFR code; incoming trunk ID; outgoing trunk ID; and toll center number.

Referring to FIG. 5, the input portion of the T1 I/O interface 11 of FIG. 1 accepts serial bipolar PCM data from a T1 line 35 carrying information in D3 format. Each time slot of incoming data comprises 8 bits of PCM sampled data so that there are 192 bits for 24 channels per T1 line plus one framing bit. Incoming data is stored and synchronized to the IMAS system frame. Serial data is converted to 9 bit parallel (8 bits data plus parity bit) and sent to the time slot interchanger (TSI). Carrier group alarm (CGA) detection (Bit 2=0) and signal bit recovery (Bit 8 of 6th and 12th frames) is also accomplished. Error signals and signal bits are sent to the signal processor for further analysis.

It is possible to operate 16 of these interfaces per line group. Each interface accommodates one T1 line or VB3 voice bank. Up to 4 line groups per system may be used.

Incoming PCM data on Bus 35 from the unit 20 is converted to normal TTL levels by a conventional Unipolar Converter 102 and gated through the conventional Data Select 131 on Bus 103 by an Active signal applied to the line group in response to the Master Clock 78 under control of the system controller 50 of FIG. 1.

Although the data into interface 11 is from a T1 line, the system could be modified to receive data from a satellite, remote terminal, or teletype.

The Master Clock 78 provides the necessary timing signals to the Input Timing Generator (ITG) 129 via bus 60. The ITG 129 includes conventional counters and logic to distribute common miscellaneous timing functions to the various subsystems of the I/O Input Interface of FIG. 5. The conventional Clock Recovery circuit 110 receives the PCM data and reconstitutes a clock signal to provide a clocking edge that lags the data bit by one quarter period of the square wave period. Data is loaded from Data Select 104 into a holding buffer in the Elastic Store 106, a 256 bit store, via bus 105 until the next available write window from the Read/Write Control (RWC) 120. The Read/Write Control 120, a typical selector circuit to insure there is no interference between read and write times, then gates the Write Address Counter 118 through a conventional Address Select Circuit 129 to the Elastic Store 106 and writes the data bit at this address location on a 256×1 bit RAM. The Write Address Counter 118 is 8 bits wide (to address 192 bits of data per T1 line) and free running at 1.544 MHz. Since the system clock has a basic frequency of 3.088 MHz, it will have 2 rising edges per incoming data bit; thus there are two available write windows per incoming bit to assure that each bit will be written in the Elastic Store 106 regardless of the phase or jitter of the recovered incoming clock with respect to the master clock timing of the ITG 129.

When the line group is not active, data from the output interface of FIG. 6 is looped around through Data Select 104 of FIG. 5 via Bus 199. This allows off line checking of a line group to be sure that it is ready for service, the details of which are more fully described in the above-identified application entitled "Service Generator Checking Apparatus And Method".

The Reframe Control Circuit 144 controls the state of the Read Address Counter 154, and clocks the appropriate data bit from the Elastic Store 106 into the Serial To Parallel Converter 136 via Bus 132. Converter 136 is a conventional shift register. When the 8 bit word (D3 format) of a T1 channel is present in the Serial To Parallel Converter 136, it is clocked into the Output Buffer 140 via 8-Bit Bus 138 by the ITG 129 along with a parity bit from Parity Generator 134 computed at the input to the Serial To Parallel Converter 136. ITG 129 then sequentially connects this output buffer 140 in its turn with 15 other input interface circuits of the FIG. 5 type to the TSI bus 26-1 through Line Driver 143 and bus 24-1 to the TSI of FIG. 7. TSI bus 26-1 is a conventional three-state bus that is accessed by the other fifteen T1 input interfaces in their turn to form 384 (16×24 D3 channels) time slots. The 16 input interface circuits each with their 24 T1 channels (D3 format) form the 384 (16×24) channels per line group.

Once per frame, the Reframe Control 144 compares the frame bit at the appropriate position in the Serial To Parallel Converter 136 with its own frame code generator. If two or more errors in four frames occur, a reframe mode is initiated. Reframing is accomplished by adjusting the delay through the Elastic Store 106. A frame error signal appears on bus 147 for transmission to SP 72 of FIG. 1 via bus 73-1.

The Reframe Control 144 includes a comparator, four frame counter and processor, which includes a PROM and data selector. A group of data bits in the vicinity of the system frame bit time is inspected for potential frame bits. Each bit position is checked until it either produces the correct framing sequence for ten frames or one error in a potential sequence is detected. When the entire group has been checked and no frame code sequence has been found, the Read Address Counter 154 is advanced to select the next group of bits. This process continues until the above mentioned framing sequence is found. The "found" bit position is synchronized with the system frame bit position by delaying the Read Address Counter 154 and a framed condition is reestablished.

An exemplary flow chart for describing the operation of the processor contained within the reframe control is shown in FIG. 13. The processor of reframe control 144 will execute the following steps for finding the framing bit for the line group.

In FIGS. 3 and 4, the frame bit position shown occurs once at the start of each frame. It contains a framing code that takes 12 frames to repeat.

Referring to FIG. 13, steps 0, 1, 2, 3 and 5 are executed in a sequence when the reframe control 144 is in a framed condition. The read address counter 154 and converter 136 of FIG. 5 are continuously being clocked once per incoming bit. Thus the read address counter 154 keeps pace with the write address counter 118.

The processor will wait at step 0 until IFC (input frame control) decision sends it to step 1. IFC is a typical signal from the ITG 129 of FIG. 5, which occurs one D3 time slot after the frame bit. If IFC is no, the processor returns to step 0. If IFC is yes, the processor proceeds to step 1.

At step 1, the frame code generator/comparator (internal to the reframe control 144) is clocked to keep its internal frame bit up to date. In addition, the Address Counter 154 and Converter 136 of FIG. 5 are incremented as in step 0.

At this point the incoming frame bit FB is compared with the internal frame bit. Assuming the four frame counter is at frame 0, if no code error is detected (CE=OF) the processor will continue to step 2 and clock the address counter 154 and converter 136 of FIG. 5.

From step 2, the processor goes to step 3 if the four frame counter is at frame zero in its count where the four frame counter is kept reset and a reframe flag is lowered. Lowering the reframe flag will apply the appropriate flag state to the most significant bit of the four frame counter when being loaded.

The processor returns then to step 0 and repeats the cycle.

In step 1, if the frame code generator does detect a code error, at frame zero or no code error at frames 1, 2, or 3 (CE=OF is a yes condition), the processor branches to step 5 where the four frame counter is incremented to the next state. The cycle repeats until the four frame counter returns to 0 or another code error occurs. A second error in four frames causes the reframe mode to be entered at step 12 via step 2.

At step 12, the reframe flag is raised when the four frame counter is reset. Raising the reframe flag applies the appropriate reframe flag stage to the most significant bit (MSB) of the four frame counter when being loaded. Also, the read address counter 154 of FIG. 5 is advanced 8 counts with respect to the write address. For 3 consecutive frames, the 8 bits in this frame position are loaded into converter 136. This is accomplished in steps 13, 14 and 9 and is controlled by decision IRL (input reframe load) and the four frame counter of reframe control 144. IRL is another timing signal from ITG 129 of FIG. 5.

When the four frame counter returns to frame 0, the processor branches from the load loop to state 15. At this point the 4th set of 8 bits together with the three previous sets of 8 bits form 8 4-bit words that are clocked into the frame code generator and inspected one at a time for any of the twelve codes shown in FIG. 3. If one is found, the code compare (CC) indicates that a potential frame code sequence has been found and the processor goes to step 6. If no valid code is found the processor branches to step 6 after the 8th word has been inspected.

Referring to FIG. 13, at step 6, the processor checks CC to see if it has terminated the search mode. If not the processor jumps back to step 12 to repeat the process for the next 8 bits in the frame. If CC is a yes, then the sync mode is entered at step 7.

In steps 7 and 8, the four frame counter is set to zero to prepare for the check mode, and the position of the found code is synchronized to the system frame bit position by decision IAS (input address sync), a timing signal from ITG 129 of FIG. 5.

Steps 10, 11 and 4 are the check mode in which the processor inspects the FB position in the normal manner for 3 more frames, after rechecking the found bit. Decision CE (code error) indicates that the incoming frame bit is not equal to the frame code generator bit. If CE is yes, it will cause the processor to jump back to step 12 to repeat the process. Otherwise the four frame counter returns to 0 and the processor branches to step 5. Three more FB positions are checked for errors with a single error causing a return to step 12 via step 2.

After 10 consecutive FB positions containing no errors have occurred, the processor restores a framed condition at step 3.

In FIG. 5, signal bits are written into the Signal Bit Store 150, a 32×4 bit RAM, during frames 6 and 12, as determined by the internal frame code generator of the Reframe Control 144 from the appropriate output of the Serial To Parallel Converter 136. Since the Reframe Control 144 synchronizes the incoming frame bit to the nearest system frame bit position, the incoming frame number bears no relation to the current system frame number. Therefore, signal bits from the Signal Bit Store 150 are allowed to stay on line for 12 consecutive frames to be sure they are valid during the system signaling frames.

During normal operation, the second bit position (next to the most significant bit) in all 24 words is inspected by conventional Detector 148. If all 24 bits are zero, then a B2=0 signal appears on bus 149 which is sent to SP 72 of FIG. 1 via BUS 73-1.

The B2=0 means that all 24 bit 2 positions in one frame (D3 format) are 0. This is a carrier group alarm (CGA) sent by the associated D3 equipment. The framing error has priority over the B2=0 error.

Signal bits, B2=0 error signals, and framing errors are applied to the SP bus 73-1 and sent to the SP in the same manner as data sent to the TSI. These signals are processed and relayed to the System Controller to give trunk status information.

Path tests are performed to insure that the particular path is or is not set up through the TSI. The Path Test Generator (PTG 156) receives a command from the SP via bus 73-2 to invert the parity bit of the channel under test. The parity is inverted at line driver 143. Parity checking of all output interfaces discloses the results of the path test. Further details of the path test are described in the above-identified application entitled "Path Test Apparatus and Method".

Referring to FIG. 6, the output interface accepts data from the TSI and Signal Processor (SP) in parallel form. It is converted to a serial format and then to bipolar PCM to be applied to the T1 line. During signaling frames, signal bits from SP are inserted at the appropriate place in the parallel word. The signaling frames in the IMAS are frames 6 and 12 with the 8th bit of each channel time slot allocated for a signal bit to indicate on-hook or off-hook status. Also, a zero suppression circuit maintains at least a 1 out of 16 pulse density on the T1 line. The zero suppress circuit monitors all 8 bits being applied to the parallel to serial converter. If all 8 bits are 0, Bit 7 is forced to a one. This insures that no more than 15 consecutive zeros will appear in a T1 stream, a condition necessary to keep clock recovery circuits alive. A parity check is made of all data. Parity errors are sent to the signal processor for analysis.

It is possible to operate 16 of these interfaces per line group. Each interface accommodates 1 T1 line or VB3 voice bank. Up to four line groups per system may be used.

Referring to FIG. 6, the output portion of the I/O Interface 11 of FIG. 1 is shown in more detail. Data from the TSI is applied to the conventional Input Buffer 167 via Line Receiver 165 and buses 28-1, 30-1.

The Output Timing Generator (OTG) 196 loads Input Buffer 167 whenever an outgoing PCM word appears on the bus 30-1. The OTG 196 is similar to the ITG 129 of FIG. 5. When 16 words have been loaded (1 word in each buffer for up to 16 interfaces), the conventional Parallel To Serial Converter 171 in all of the interfaces is loaded with this data. The serial data immediately starts shifting out on the T1 line 41 via the Bipolar Converter 179 and the T1 Line Driver 181. The Active signal from Master Clock 78 of FIG. 1 controls a pair of relays that connect the T1 Line Driver to the T1 line. The primary and secondary interfaces are connected in parallel at the T1 line. Therefore the off-line driver is disconnected by the relays.

During system frames 6 and 12, signal bits are inserted at Bit 8 via the Signal Select 175, which is similar to data select 104 of FIG. 5. In FIG. 6, signal bits are received from the signal processor via bus 73-3, 192 and line Receiver 191, and are loaded with parity in the same manner as data from the TSI. Bus 73-3 corresponds to Bus 73 of FIG. 1.

In FIG. 6, the Zero Suppress circuit 174 is a comparator circuit that monitors all 8 bits being applied to the Parallel To Serial converter 171. If bits 1-6 and 8 are 0, Bit 7 is forced to a 1. This insures that no more than 15 consecutive zeros will appear in a T1 stream, a condition necessary to keep clock recovery circuits alive.

The conventional Parity Checker 184 is preset to its start state at the beginning of each serial word. The preset state is determined by monitoring data parity, signal parity if frames 6 or 12, and the Zero Suppress circuit 174. The Parity Checker 184 computes parity on the serial word as it is applied to the input of the T1 Line Driver 181. The proper parity error condition exists at the end of the serial word and is loaded into the Parity Muxer 186 along with the 15 other parity error conditions. The Parity Muxer 186 sends the 384 channels of parity error data per frame to the Signal Processor 72 of FIG. 1 via Line Driver 188 and buses 187, 73-2. Bus 73-2 corresponds to Bus 73 of FIG. 1.

In FIG. 6, the frame bit is always applied to the serial input of the Converter 171. The OTG 196 only allows the frame bit to shift through to the output at the appropriate frame bit time.

When a line group is off line, the Active signal will select data from the Bipolar Converter 179 instead of data from the Unipolar Converter of the T1 input interface of FIG. 5. This allows a loop around test to be performed by the Service Generator (SG) 22 of FIG. 1. The T1 input interface frames up on the serial T1 stream from the output section allowing TSI output bus data to be looped around to the TSI input bus.

Referring to FIG. 7, the timed division multiplexed PCM digital switch network configuration used in the IMAS is shown. The digital switch comprises line groups 0-3 and TSI 0-3 of FIG. 1. Network paths have been derived by multiplexing together sixteen 24-channel T1 lines in a line group to form 16×24 or 384 time division channels or time slots. In a full size IMAS there are 4 line groups 10 for a total of 1536 terminations or channels. Each line group has primary and secondary redundancy as previously described, but not shown here. The channels appear sequentially on the horizontal input paths 26-1 to 26-4 of the network and are switched to the desired outgoing paths 28-1 to 28-4 by the time slot interchanger TSI φ-3, associated with the vertical paths 208-1 to 214-4 of the network.

As an example, assume a call is in progress from LG0 to LG1 through TSI 0. In operation, under control of the System Controller 50, an originating channel sample from one of the T1 lines is multiplexed out on a horizontal path such as path 26-1 as one of 384 time slots for the group. The data is switched to a vertical path such as 210-1 to TSI 0. The TSI 0 transfers the sample to its memory, where it is held until the terminating channel time slot in the next frame appears, whereupon the sample is transferred back on path 208-1 and switched to a path such as 28-2 to the line group LG1 and the T1 line on the terminating channel.

Since each line group can be connected to 16 T1 lines each with 24 channels, and has a channel repetition time of 125 us, the line group must output to the TSI 16×24 channels every 125 us or 1 channel every 324 ns. Each channel on the T1 line contains 8 data bits; thus each output channel from the line group must have 8 data bits. If transmission were kept serial like the T1 line input, the data rate would be 8 bits/324 ns or 40.5 ns/bit or 24.7 Mb/s. To solve this high rate problem, the line group, as previously described, converts the serial T1 data to a parallel data bus, adding a parity bit to form 9 bits. The actual data transmission rate is the same but now 9 bits are transmitted at one time and the bus transmission rate becomes 3.088 MHz or one 9-bit sample every 324 ns.

The TSI has the capability of switching channel time slot data from any one of four line groups to any other channel time slot of any of the four line groups. The line groups are redundant, thus a full system with 1536 terminations has 8 line groups and 8 data buses (4 primary and secondary). Only ½ of the line groups in the fully redundant system are on-line processing call traffic at any one time. The other half of the line groups are off-line and are occupied with self-testing to insure availability for switching on-line should the active line group experience a failure. In a full system of 8 line groups, each TSI connects to the 8 line groups (4 each for primary and secondary) through 8 separate data buses and 8 cross point switches.

Referring to FIG. 9, a Time Slot Interchanger (TSI) 21 of FIG. 1 is shown in more detail, for a redundant system with a total of 2 line groups, each line group having a primary and secondary interface. 18-bit data buses 301-304 each replace the pair of 9-bit buses 26, 28 and 44, 46 of FIG. 1. Buses 301-304 transmit PCM data between the line groups and the TSI. Buses 301-304 would also connect to Service Generators 22, 23 of FIG. 1.

Data Sample Memory 313 is connected to data buses 301-304 through a three-state data bus 311 (such as National Semiconductor Corporation's Tri-State Bus Drivers and Receivers) and cross point switches (CPS) 306-309. Each cross point switch includes differential line drivers and receivers and three-state data buses 311 and 312. Similarly, Data Sample Memory 314 is connected to data buses 306-309 through another three-state data bus 312 and CPS 306-309. Thus, the TSI cross point switches are used as an interface and switch to connect the TSI with the PCM data Buses 301-304 coming from the line groups. In each TSI, up to 8 cross point switches are used to interface to the maximum 4 primary and 4 secondary data buses from the line groups.

Data from bus 301 is input only to CPS 306 for switching to either data bus 311 or 312 and thereby input to DSM 313 or 314, respectively.

Controls for activating the CPS 306-309 are located on the Cross Point Control And System Clock (CPC) 316. The information necessary to control which cross point switch is to be active at any one time comes from the Control Memory 326. The CPC 316 includes a conventional decoder to decode the information from the Control Memory 326 and synchronizes it with the proper master clock edge necessary to activate via buses 319-322 the input and output cross points on the cross point switch that was decoded. The CPC 316 also provides a master clock interface for timing in the TSI. The signals MCLK1 and FS1 from the Master Clock circuit of FIG. 1 via bus 60 are the only clock signals necessary for the TSI.

The PCM data storage is provided by memories 361, 366. Each memory is a 9 bit×512 word memory of which 386 are used, and also contains an address multiplexer 353, 354, which are controlled by an odd-even frame signal 355 from the time slot address counter (TSC) 332. The multiplexer is used to select addressing from either the Control Memory 326 or the TSC 332. When one data sample memory is addressed by the TSC 332. When one data sample memory is addressed by the TSC 332, the other memory is addressed by the Control Memory 326. The addressing alternates between Control Memory 326 and TSC 332 during successive even and odd frames.

Each DSM 313, 314 also contains an input buffer 360, 365 and output buffer 362, 367. Buffers 360, 365, 362 and 367 are 1×9 bit latches. The input buffers 360, 365 insures the PCM input data is presented to the memory chips 361, 366 for a full channel time slot of 324 ns. PCM data stored in the memories 361, 366 is output to an output buffer 362, 367 for one channel time slot storage which insures that data is presented to a cross point such as CP 306 and thereby to the time slot bus 301.

The TSC 332 provides three functions in the TSI. First, it contains a 9-bit binary counter which provides a time slot address for the Control Memory 326 and DSM 313, 314. The master clock signal from the CPC 316 via bus 324 is used to advance the counter in binary sequence from 0-385, where each number is a channel number. Each time the counter is reset to 0, the Even-/Odd Frame signal on Bus 355 changes to the opposite state. Frame synchronization is used to keep the counter synchronized with the rest of the IMAS. The second function of TSC 332 is to provide load, drop and read control synchronization for the Control Memory 326. Channel information stored in the From (F) and To (T) register 337 is compared with the address counter and ANDed with control signals from the TSI-CPU 348 to generate write and read commands for the Control Memory 326. For its last function the TSC 332 includes status registers and address latches (not shown) for storing the address and type of parity error from the DSM 313, 314 and the Control Memory 326 via bus 334. This information is sent to the System Controller upon request through the System Interface 341.

The Control Memory 326 is used to store all information necessary to set up a path or paths through the switch. It is used to control the CPS 306–309 and to address DSM 313, 314 to relate the "From" channel time slot to the "To" channel time slot.

The Control Memory 326 is a 17×512 memory, of which 386 bits are used, which is constantly read and the outputs are used by DSM 313, 314 and CPC 316 via buses 329, 330, respectively to control time slot switching. Information stored in the memory is obtained from the System Controller 50, 64 of FIG. 1. The Control Memory 326 is divided into two parts, the first of which is used only to control the "From" channel time slot cross points. The remainder of the memory is used to control the "To" channel cross points and the addresses of the DSM 313, 314. The Control Memory 326 includes two parity bits. During one frame, the "From" information will control the connections of CPS 306–309 to Bus 311 by the Even/Odd signal on Bus 355. During the next frame, the "From" information will control the connections of CPS 306–309 to Bus 312. The "To" information will operate similarly, except that the connections are reversed.

The System Interface 341 and the F and T Register 337 work together to load, drop, or read a path in the TSI. The System Interface 341 has communication in both directions to both the primary and secondary System Controller 50, 64 via buses 57, 63 through a conventional Universal Asynchronous Receiver/Transmitter (UART). The input information from a System Controller is received by the Interface 341 and sent to the CPU 348 for command decoding, then to the F and T Register 337 for temporary path channel storage. The System Interface 341 is used to interface the TSI with both System Controllers 50, 64.

The System Interface 341 also provides a holding register for reading the Control Memory 326 via 17-bit bus 342. Information to the System Controller 50, 64 from the status register in the TSC 332, command information from the CPU 348 and path read data from the memory output registers in the System Interface 341 are sent to the UART on a three-state bus 335 for transmission back to the SC.

Commands and data from the system controller enter the interface 341 in serial form of an 11 bit byte, 8 data bits, 1 parity, start and stop bit which is converted to a parallel byte by the UART and output to CPU 348 via bus 349.

Data to be sent to the system controller is sent in a serial 11-bit byte as that received by UART. The receive data rate is 31.25 K baud. The transmit data rate is 3.906 K baud. Serial data is sent out via a differential line driver to either system controller. The selection of which system controller can communicate with the TSI is determined by the Active signal from the on-line system controller which is received by a differential line receiver and is used to enable communication with the active System Controller and to enable cross point control 316 via bus 343.

The F and T Register 337 is used for temporary storage of all path information necessary to load the Control Memory 326. The TSI gets path information in byte serial format from the System Controller. All bytes must be in the TSI before loading takes place. The F and T Register 337 is used to accumulate these bytes and to connect the proper bits from these bytes to the TSC 332 and the Control Memory 326 via Buses 339, 338. Input data to the TSI from the System Controller enters the F and T Register 337. The "From" and "To" refers to the way a path is set up in the TSI and is always "From" a channel "To" another channel, without regard to which channel may be originating and which may be terminating. The F and T Register 337 contains two 12-bit registers which hold the "From" channel number and the "To" channel number when they are being loaded into the Channel Memory 326. Eleven bits in each register identify the channel time slot (9 bits) and line group (2 bits). The twelfth bit is for parity.

All communications controlled between the TSI and System Controller and all internal loading, dumping or reading control is sequenced by the TSI CPU 348. The CPU 348 is a small stored-program, 256 step microprogram processor whose program is contained in two 4×256 PROMs.

The CPU 348 can check input instructions from the System Controller, check hardware flags from circuits in the TSI and do program branching according to the condition of the instructions and flags.

The operation of the processor 348 will be explained in conjunction with FIGS. 10 and 11, which show an exemplary flow chart for the operation of the TSI processor, and with FIG. 9.

In FIGS. 10 and 11, the processor will commence at state A, assuming that an initial up sequence has been completed.

At step A, the processor will loop until a character is received and entered in a command register in the SC Interface 341. The processor will continue to determine whether any UART errors are detected in the system interface. If yes, the processor will go to step B as shown in FIG. 11. to output an UART error message and reset the UART, returning to step A. If there are no UART errors, the processor will determine if there are any command errors. If yes, the processor goes to step C in FIG. 11 and outputs a command error message and resets the UART.

If there are no command errors, the processor will continue to determine if there is a status request command or loop back command. If either is a yes, the processor goes to steps D or E in FIG. 11. Step D outputs the contents of the status register of TSC 332 of FIG. 9. Step E will output a received character.

The subprogram 1 (SPRG 1) is shown in FIG. 11 in which the processor will loop and increment an index register until either a character is received or the index equals 4096. If the index increment to 4096 the processor will proceed to step F which will output a UART time out message and reset the UART.

If the character is received, the processor will then load registers F1, F2, T1 and T2. Registers F1 and F2 form the F portion of register 337 and registers T1 and T2 form the T portion of register 337 of FIG. 9.

In FIG. 12, if a load command is received, the processor will determine through step H if either path set up by the system controller is busy. That is to say, the processor will determine whether the F data and T data paths requested by the system controller are availalbe.

As seen in step H, if the F data path is busy, the processor will go to step K to output the busy 1 flag set message. Similarly, if the T data is busy, the processor will go to step L to ouput a busy 2 flag set message.

Step H gives the time slot interchanger the capability of determining path availability in the TSI by this routine without the requirement of a memory map in the system controller.

In FIG. 10, if the processor receives a dump command, it will go to step I. In step I, the processor will proceed through the routine and output a dump complete message and return to Step A. If there is no read command, the processor goes to Step C and outputs a command error message and returns to Step A.

The Processor will continue through the Step A outputting memory registers 1–4, reset the UART and return to Step A.

Because the time slot interchanger is maintaining the status of the calls in progress, the system controllers 50,64 can "relearn" what the status of the call is should both controllers experience a failure. Thus, accurate accounting records can be maintained as no calls are lost.

Referring now to FIG. 9, an example of a call progressing through the time slot interchanger will be given, assuming that the system is operating with two primary and two secondary line groups and that the primary line groups are on line. Each TSI in the network has the capability of switching the send and receive PCM data from any of the 384 time slots to any other time slot. Since the TSI is a folded duplex switch, it switches both the send and receive data at the same time and any matrix path is two way and equivalent to a four wire switch. It will be assumed for purposes of explanation that the System Controller has instructed the TSI to set up a call path connected from line group one, channel 3 (1-3) to line group two, channel 4 (2-4).

Assuming an even frame number for the call path progress, DSM 313 contains PCM data from line group two, channel 4 (2-4) at address 3 while DSM 314 contains PCM data from line group one, channel 3 (1-3) at address 3. The Control Memory 326 includes a CMF 327 and CMT 328 portions which control which cross point switch CPS 306 or 308 closes at which time slot, thereby providing the space division switching between the two line groups. The CMF 327 ("From" channel cross point control) and CMT 328 ("To" cross point control) provides the path store in the TSI and are loaded by the System Controller. The "From" and "To" refers to the way a path is set up in the TSI, and is always "From" a channel "To" another channel without regard to which channel may be originating and which may be terminating. When the CMF 327 portion of the CONTROL MEMORY 326 is addressed at address 3, the data at that location will close cross point 306. For simplicity, the designation CP1 will indicate CPS 306.

When the CMT 328 is addressed at 4, data at that location will close cross point 308 and the rest of the CMT 328 contains the information necessary for time division switching and is used to address DSM 313, 314. In this example, the data at address location 4 of CMT 328 is an address used to index DSM 313, 314 at location 3. The designation CP2 at location 4 indicates cross point switch 308.

When the TSC 332 counts to 3, the CMF 327 is addressed at 3 and closes cross point CP1 for the Bus 311. The DSM 313 is also addressed at 3 by the TSC 332 and the old line group two, channel 4 (2-4) PCM data is sent to line group one, channel 3, and the PCM data from line group one, channel 3, replaces it at the same time. No action occurs at this time (time slot 3) on the CMT 328 or DSM 314 unless there were other paths set up in the TSI.

The TSC 332 next advances to 4, which addresses both the CMT 328 at address location 4. The CMT 328 closes cross point CP2 on the Bus 312 and addresses DSM 314 at address 3.

The old 1-3 PCM data in DSM 314 is then sent to line group two, channel 4, and new PCM data from line group two, channel 4 replaces it. No other action occurs in the CMF 327 or DSM 313. The TSC 332 will now continue counting until it reaches its maximum count (the end of the frame—386) and goes back to 1. Connections in the TSI are then changed for an odd frame by the even/odd frame signal on bus 355.

During time slots 1 and 2 of the odd frame, no action occurs. When the TSC 332 counts to 3, it addresses CMF 327, which closes cross point CP1 on Bus 312, and the DSM 314 now addressed by the TSC 332 sends its old 2-4 PCM data to line group one, channel 3, and loads new 1-3 PCM data from line group one, channel 3. No other action occurs at this time (time slot 3).

When the TSC 332 reaches count 4, the CMT 328 closes cross point CP2 on the Bus 311. The DSM 313 now addressed by the CMT 328 at location 3 sends its old 1-3 data to line group two, channel 4, and loads new 2-4 PCM data. The TSC 332 will now count through a full frame (386 time slots) and change the connections back to an even frame. Thus one full cycle of two frames has occurred and the data in the DSM 313 and DSM 314 will be from the same line group and channel as that shown in the FIG. 9. This process continues in this manner for each path set up in the TSI.

An exemplary flow chart for the system controllers is shown below in Chart I.

CHART I

| State | |
|---|---|
| φ | IDLE |
| 1 | EXAM CLASS MARK |
| 2 | RCVG 1rst CLD DIGIT |
| 3 | RCVG 2, 3rd CLD DIG. |
| 4 | INITIAL XLATION |
| 5 | STATE CHG/DIG INPUT |
| 6 | OG. SIGNAL CK ROUTINES |
| 7 | RCVG CLD DIG RT |
| 10 | HAVE CLD DIG EXP |
| 11 | ST.CHG/DIG IN-INTERCHG CODE T.O |
| 20 | SATT ANI-SELECT MFR |
| 21 | S.U.P. MFR-ORIG TRK |
| 22 | PTST MFR-ORIG TRK |
| 23 | SATT ANI START SIG. ABST SENDS OFF HOOK→ORIG TK |
| 24 | HAVE MFR, SEND ON HOOK |
| 25 | AWAITING AE ANI DUAL TONES |
| 26 | RCVG AE ANI DIG |
| 27 | ANI FINISHED DROP PATH-TRK-MFR |
| 30 | AWAITING PTST RET. |
| 31 | PATH & MFR DRPO. RCVG CLD DIG |
| 60 | ONI |
| 61 | CHECK FOR IDLE ONI TRK |
| 62 | SET UP PATH INC TRK-OGT |
| 63 | AWAITING PTST INC-OGT |
| 64 | SEND MESSAGE TO ONI |
| 65 | AWAIT W.P. REPLY & ONI HANDSHAKE |
| 66 | RECEIVING ONI DIGITS |
| 67 | AWAITING ONO RET AFTER SENDING SNDR MESSAGE |
| 70 | HAVE ONI DIG-DRP PATH |
| 71 | AWAIT PTST-SP REPLY |

CHART I-continued

| State | |
|---|---|
| 73 | ONI ATB-SEND RBT |
| 74 | AWAITING IDLE ONI TRK |
| 77 | IF AE TRIBANI TRK SEND OFF HOOK |
| 100 | ROUTE TRANSLATION |
| 101 | CHECK SCREENING TABLE |
| 102 | CHECK PRIMARY TRK CRP |
| 105 | FIND IDLE O.G.T. |
| 106 | SEIZE OUTGOING TRK SEND OFF HOOK TO OGT |
| 114 | SET UP OUTPULSING |
| 120 | SELECT MF SENDER |
| 121 | SET UP PATH MFS-OGT |
| 122 | PATH TEST MFS-OGT |
| 124 | AWAITING THE BEG NG OF WINK |
| 125 | AWAIT END OF WINK/DELAY DIAL |
| 126 | AWAITING STOP DIAL |
| 127 | AWAIT. END OF OUTPLSG DELAY |
| 130 | OUTPULSE KP. |
| 131 | OUTPULSING DIGITS |
| 132 | AWAIT. MFS TO SEND DIG. |
| 133 | AWAIT. MFS TO SEND "ST" |
| 134 | AWAIT. 100 MS "ST" TO-DRP PATH |
| 135 | SET UP PATH INC-OGT |
| 136 | AWAITING PTST INC-OGT |
| 200 | CK IF ALREADY HAVE ANS. SUPV |
| 201 | AWAITING ANSWER SPV |
| 202 | AWAIT. END OF CHARGE DELAY |
| 203 | CALL IS IN PROGRESS |
| 210 | AWAITING CPD TIME OUT |
| 220 | SET UP TIME DURATION FOR BILLING RECORD |
| 221 | AWAITING FOR SPO ONHK THEN SET UP BILLING REC |
| 222 | AWAITING BILLING REC. PROCESS |
| 230 | TEST TRUNKS FIRST DIG. = 1 |
| 231 | AWAIT. FOR 3RD DIG. LINK THRU ABST |
| 232 | TTRK 109 ACCEPT 3 MORE DIGITS PERMIT TTK CODE TO SNBR |
| 233 | 102 1HZ WI 9-10SEC OFF HK |
| 234 | WAITING FOR ON HK/TIME OUT |
| 235 | OUTPUTTING ONHK TOINC. TURN OFF TONE |
| 236 | WAITING FOR ON HOOK |
| 237 | TEST TRK 100 |
| 240 | IDLE ON INC. WAIT FOR ON HOOK |
| 241 | CALL INWARD TO T.TRK 1 |
| 242 | 103-ON/OFF HOOKS |
| 243 | 103 A&B BITS SENT |
| 260 | TRK IDLE |
| 261 | AWAITING MFR, SET UP PATH |
| 262 | AWAITING DIGITS |
| 263 | DISABLE MFR |
| 265 | TRK SENT IDLE |
| 266 | DROP PATH, MFR |
| 267 | AWAITING IDLE |
| 300 | SET UP ANNOUNCEMENT TRUNK |
| 301 | WAITING FOR ONHK ONINC PATH SETUP INC-ANN. TRK |
| 340 | PATH DID NOT DROP |
| 342 | STAND BY IDLE |
| 343 | STANDBY/CALL IN PROGRESS |
| 344 | STANDBY/CALL IN PROGRESS FINISHED W/OGT |
| 345 | S.P. RETS WHEN DONE |
| 346 | PATH SET UP VERIFICATION COMPLETE |
| 347 | IDLE-AWAITING CTS ENTRY |
| 350 | BEGIN IDLE SEQUENCE |
| 351 | AWAITING PATH TEST DONE |
| 352 | AWAITING SP. TO SEND ON HOOK TO OGT |
| 353 | AWAITING S.P. TO SEND ON HOOK TO INC. |
| 354 | STATUS REQUEST ONINC TK |
| 357 | PHONY STATE FOR FE/B2 ERROR |
| 360 | REORDER SEQUENCE |
| 361 | AWAITING PTST DONE |
| 362 | AWAITING S.P. TO SEND ON HOOK TO OGT |
| 363 | AWAITING USGO RET |
| 364 | AWAITING STATUS REQUEST |
| 365 | RECORDING ONINC TRK |

CHART I-continued

| State | |
|---|---|
| | AWAITING IDLE |
| 366 | AWAITING IDLING OF S.G. |

The operation of the exemplary flow chart of the system controller will be described below.

Referring to the flow chart, State 0 is an idle state. The system controller will go to State 1 and examine the class marking. If a digit is received too soon, the controller will go to State 360. If the called number is in MF format, the controller goes to State 20. If the called digit is dial pulse, the controller continues to State 2. If the party went on-hook at State 1, the controller goes to State 350.

If the party went on-hook at State 2, the controller goes to State 350. If an invalid digit is received or the first digit is 0, the controller goes to State 360. If the first digit is one, the controller goes to State 230. If no digits have been received within 30 seconds, the controller will go to State 360. If the first digit received is not a 0 or 1, the controller goes to State 3.

In State 3, the system will receive the second and third called digits. As before, if on-hook occurs the controller goes to State 350. If an invalid digit or interdigital time out occurs, the controller will go to State 360. If the controller receives three valid digits, it goes to State 4.

At State 4, the valid three digits will be translated. The three digits will identify a geopraphical area of the numbering plan area (NPA) used in present switching systems.

In State 5, if the 3 digits received are a vacant code, the processor goes to State 300. If valid digits are received and the system utilizes a Strowger Automatic Toll Ticketer (SATT ANI), the controller goes to State 23. If an interdigital time out occurs, the controller goes to State 360. If not an automatic electric (AE) tributary ANI, the controller goes to State 6.

In State 6, if the number of digits received are the number of digits expected, the controller goes to State 10. If a time out occurs before all digits are received the controller goes to State 360. If more digits are to be received, the controller goes to State 7.

At State 7, the controller waits until all digits are received or the caller has hung up. If all digits expected are received, the system controller goes to State 10.

In State 10, if there is an interdigital time out the controller goes to State 360. If there is not an interchangeable code, the system controller goes to State 77. If it is an interchangeable 7 or 10 digit code, the controller goes to State 11.

In State 11, if no more digits are received and there are 7 digits, the controller goes to State 10. If more digits are received, the controller returns to State 6.

As previously described, if the system controller determines there is a SATT ANI start signal, the controller goes to State 23. An off-hook is sent to the originating trunk to signal that the system is ready for ANI (automatic number identification). The system controller will instruct the signal processor routing to output a message. If the transmit by the signal processor has an error, the system controller will go to State 360. If the transmit is successful, the system controller has initiated a wink. The SC will go to State 20. Further details of the operation of the signal processor are described in the above-referenced application entitled "Register/Sender".

In State 20, the controller will select an MF receiver to identify the SATT ANI digits. Further details of the operation of the MF receiver are described in the above referenced application entitled "Multifrequency Sender/Receiver In A Multi-Time Slot Digital Data Stream".

In State 21, a path between the MFR of the system and the originating trunk is set up. If the path set up is good, the controller continues to State 22. If not, the system controller will go to State 360. The path is set up from the originating trunk through the Time Slot Interchanger to the MFR. Further details of the operation of the Time Slot Interchanger are described in the above referenced application entitled "Time Slot Interchanger".

In State 22, a path test is initiated between the MFR and originating trunk. If the path test is busy or done, go to State 24. If an invalid digit or the path test is unsuccessful, the system goes to State 360. Further details of the operation of the path test are described in the above referenced application entitled "Path Test Apparatus and Method".

In State 24, the controller has an MF receiver (MFR) assigned and now sends an on-hook signal to finish the wink. As before, if there is an invalid digit or the transmission is wrong, the controller goes to State 360. If the transmission is correct, the MFR is ready to receive signals and the system goes to State 25.

In State 25, the controller is awaiting AE ANI dual tones to identify the number of the calling party.

The controller will proceed to State 26 to receive the AE ANI digits.

Proceeding to State 27, when ANI is finished, the path between the incoming trunk and the MR receiver is dropped. If the path does not drop, the controller goes to State 340.

In States 30 and 31, the MFR and path is dropped. The controller goes to State 11.

In State 77, the controller will send an off-hook to the incoming trunk. If the signal processor output reply is valid, and system goes to State 100.

At State 100, the system goes through a route translation.

In State 101, the controller checks whether the call with proceed through the digital switch. For example, local calls cannot be switched through a toll system. For a vacant code the controller goes to State 360. For local ANI, the controller goes to State 13. If ANI failure has occurred, the controller goes to State 60 for operator number identification (ONI). States 60–74 are a routine for the controller to determine by operator number identification (ONI) the calling number. In state 60, the controller will go to State 73 if all ONI trunks are busy and send a ringback tone, then return to state 61 when a trunk is available. Upon successful completion of ONI, the controller will go to State 102. The generation of the various tones utilized by the IMAS are described in the above referenced application entitled "Service Generator For Generating A Plurality Of Tones".

In State 102, the controller will look for the primary outgoing trunk group. If all trunks are busy and there is no alternate route, the controller goes to State 360. If the hard to reach numbers (HR) are at their maximum count the controller goes to State 300. Otherwise, the controller has an idle trunk and goes to State 105.

In State 105 the system searches for an outgoing trunk. If a trunk is found, the system goes to State 106.

In State 106 the outgoing trunk group is seized by sending an off-hook from the signal processor. The controller will go to State 114.

In State 114, the controller will set up in outpulsing either dial pulse or multifrequency. If multifrequency outpulsing the controller goes to State 120.

In State 120, the controller selects an MF sender and a path is set up between the MF sender selected and the outgoing trunk. Further details of the operation of the MF sender are described in the above referenced application entitled "Multifrequency Sender/Receiver In A Multi-Time Slot Digital Data Stream".

In State 122, a path test is initiated between the selected MF sender and outgoing trunk.

States 124–127 will await the end of either a wink or delay dial, techniques which are known in the art.

In State 130, the controller will outpulse the KP signal, which is the start of the MF tones.

In State 131, the controller outpulses the digits. In State 132, the system awaits the MF sender to send the digits. In State 133, the MF system sends the ST signal.

In State 200, the controller is waiting for answer supervision.

In State 203, a call is in progress and the controller will go to State 220 if the incoming trunk goes on-hook and to State 210 if the outgoing trunk goes on-hook. If an excessive conversation in excess of 5 hours is detected, the controller goes to State 220.

In State 210, the controller is awaiting the called party time out and will go to State 302 if the outgoing trunk goes back off-hook. If the called party disconnects the controller goes to State 220.

In State 220, the controller will set up the time duration for billing purposes and send an on-hook to the outgoing trunk.

In State 221 the controller is awaiting the signal processor output on-hook signal, then will begin setting up a billing record.

In State 230, the controller has received a first digit equal to one and proceeds to State 231 if the second digit is a 0.

In State 231 the system is waiting for the third digit. If the third is a 9, the controller goes to State 232. If the digit is a 2, the controller goes to State 233, if the digit is a 0 the controller goes to State 237. If the third digit is a 1, the controller goes to State 241. If the third digit is a 3 through 8, the controller goes to State 360.

In State 240, the controller is in an idle state on the incoming trunk waiting for an on-hook.

In State 260, the controller is in a trunk idle state and States 260–267 are an outgoing trunk loop used for testing.

In State 300–301 the controller is awaiting on-hook for the incoming trunk and a path is set up for the incoming announcement trunk.

In State 340, the controller is in a condition where the path did not drop and will go to State 360.

In State 342 the controller is in a stand-by idle routing which ignores the day and rate changes on incoming and outgoing trunks.

In State 343 the controller is in a stand-by and call in progress routine in which an off-hook is sent to the outgoing trunk.

State 350 is an idle sequence in which an on-hook is sent to the outgoing trunk and to the incoming trunk via states 352, 353.

State 360 is a reorder sequence in which the controller will go to State 350 if the incoming trunk goes on-hook. If an outgoing trunk is assigned, an on-hook is sent via State 362.

In States 361 and 362 the controller is awaiting the signal processor to send an on-hook to the outgoing trunk.

In State 363 the system is waiting for the service generator to send a reorder on the incoming trunk.

In State 364 the system is awaiting a status request.

In States 365 and 366 the system is awaiting the idling of the service generator.

It should be noted that the various subsystems in the IMAS operate asynchronously of each other. The particular subsystems rely on their own processors to operate properly, thereby insuring that each subsystem is an independent entity in the IMAS.

What is claimed is:

1. An integrated message accounting system operating in a multiframe format, each frame having a plurality of time slots, where each of said time frames include a framing bit for identifying each frame in said format, said system operating to switch data samples between a time slot on one communication line and a time slot on another communication line, where the samples occur as serial bits in said time slots at a predetermined rate, comprising:
    line group means including a number of primary and secondary input portions for receiving input data signals where one or the other of said primary and secondary input portions is activated for receiving said input signals, and
    a number of primary and secondary output portions for transmitting output signals where one or the other of said primary and secondary portions is activated for transmitting said output signals,
    a second number of time slot interchangers for connecting said active input portions to said active output portions where one of said interchangers is activated for connecting said input portions to said output portions whereby said input signals become output signals,
    system controller means for activating said primary or secondary portions and one of said interchangers,
    said input portions including elastic store means for storing said data samples,
    clock recovery means connected to receive said data samples for providing a clocking edge lacking the data bit for each of said samples,
    read/write control means,
    address select means responsive to said read/write control means for selecting location in said elastic store means into which said data bit is to be written,
    write address counter means and read address counter means connected to said address select means for specifying the address at which data is to be written into or read from said elastic store means,
    serial to parallel converter means connected to said elastic store means for converting said serial data samples to parallel samples,
    reframe control means connected to said read address counter for clocking said data samples from said elastic store to said converter means, and
    output buffer means for connecting said parallel samples to one of said time slot interchangers specified by said system controller means.

2. A system as in claim 1 wherein said system controller means include
    a primary system controller for activating said primary portions of said line group means and one of said time slot interchangers,
    and a second system controller for activating said secondary portions of said line group means and one of said time slot interchangers, where one of said primary or secondary system controllers is in an active state and said other is in a stand-by state.

3. A system as in claim 1 further including primary service generator means connected to said primary portions and secondary service generator means connected to secondary portions for connecting selected tone signals in time slots specified by said system controller means.

4. A system as in claim 1 further including primary signal processor means connected to said primary portions and secondary signal processor means connected to said secondary portions, said signal processor means responsive to said system controller means for detecting changes of state of supervisory signals where the supervisory signals occur as signaling bits during a signaling frame of a multiframe format.

5. A system in claim 1 wherein said line group means further include primary multifrequency sender means connected to said primary portions and secondary multifrequency sender means, connected to said secondary portions, said sender means responsive to said system controller means for sending multifrequency signals in selected time slots specified by said system controller means.

6. A system as in claim 1 wherein said line group means further include primary multifrequency receiver means connected to said primary portions and secondary multifrequency receiver means for detecting in specified time slots the presence of multifrequency tone signals.

7. A system as in claim 1 further including primary master clock means for activating said primary portions and said time slot interchangers and secondary master clock means for activating said secondary line group means and said time slot interchangers, said master clock means responsive to an active signal from said system controller means.

8. A system as in claim 7 wherein said master clock means includes means for generating a framing bit code identifying each of said frames in a multiframe formal thereby forming system frame bits.

9. A system as in claim 8 where said input portions include data selector means activated by said system controller means for receiving said data samples.

10. A system as in claim 7 wherein said master clock means generate clock signals to said line group means where the rate of said clock signals is twice the rate of said data samples.

11. A system as in claim 1 wherein said system controller means include real time clock means for timing the duration of a call between a calling and called party.

12. A system as in claim 1 further including signal processor means for monitoring the state of an outgoing trunk signal whereby said signal processor means signals said system controller means upon termination of said call.

13. A system as in claim 12 further including elastic store means for storing said data signals, read/write control means for reading and writing said data signals into said elastic store means, said read/write control means responsive to said master clock signals thereby providing two rising clocking edges per incoming data bit thereby providing two write windows per incoming bit.

14. A system as in claim 1 wherein said system controller means include means for receiving automatic number identification data.

15. A system as in claim 14 wherein said system controller means include means for receiving operator number identification data.

16. A system as in claim 1 wherein said time slot interchangers include processor means for controlling the operation of said interchanger.

17. A system as in claim 16 wherein said processor means include means for determining availability of a path in said interchangers without requirement of a memory map in said system controller means.

18. A system as in claim 17 wherein said system controller means include means for storing a called record for a telephone call.

19. An integrated message accounting system operating in a multiframe format, each frame having a plurality of time slots where each of said time frames includes a framing bit for identifying each frame in said format, said system operating to switch data samples between a time slot and one communication line and a time slot on another communication line, where the samples occur as serial bits in said time slot at a predetermined rate, comprising:
  line group means including
    a number of primary and secondary input portions for receiving input data signals where one or the other of said primary or secondary input portions is activated for receiving said input signals, and
    a number of primary and secondary output portions for transmitting output signals where one or the other of said primary and secondary portions is activated for transmitting said output signals,
  a second number of time slot interchangers for connecting said active input portions to said active output portions where one of said interchangers is activated for connecting said input portions to said output portions whereby said input signals become output signals,
  system controller means for activating said primary or secondary portions in one of said interchangers,
  said input portions including data selector means activated by said system controller means for receiving said data samples,
  elastic store means for storing said data samples,
  clock recovery means connected to receive said data samples for providing a clocking edge lagging the data bit for each of said samples,
  read/write control means,
  address select means responsive to said read/write control means for selecting the location in said elastic store means into which said data bit is to be written,
  write address counter means and read address counter means connected to said address select means for specifying the address at which data is to be written into or read from said elastic store means,
  serial to parallel converter means connected to said elastic store means for converting said serial data samples to parallel samples,
  reframe control means connected to said read address counter for clocking said data samples from said elastic store to said converter means, and
  output buffer means for connecting said parallel samples to one of said time slot interchangers specified by said system controller means.

20. A system in claim 19 wherein said reframe control means includes processor means for comparing once per frame said framing bit in each of said frames with said framing bit code whereby said reframe control means synchronizes said frame bit to the nearest system frame bit.

21. A system as in claim 20 further including signal bit store means connected to receive signal bits frame said converter means under control of said reframe control means where said signal bits occur during a signaling frame of a multiframe format.

22. A system as in claim 20 wherein said output portions include line receiver means for receiving said input signals from one of said interchangers, input buffer means for storing said samples, parallel to serial converter means for converting said parallel samples to serial samples, and line converter means for connecting said serial samples to said communication line.

23. A system as in claim 22 wherein said output portions include line receiver means connected to said signal processor means for receiving signal bits from said signal processor means, input buffer means for storing said signal bits, and signal select means for connecting signaling bits from said input buffer means into said converter means.

24. A digital switching system operating in a multiframe format having a number of time frames each consisting of a plurality of time slots, said system operating to switch data samples between time slots, where said samples occur as serial bits in said time slots, comprising:
  line group means including
    a number of primary and secondary input portions for receiving input data signals where one or the other of said primary and secondary input portions is activated for receiving said input signals,
    a number of primary and secondary output portions for transmitting output signals where one or the other of said primary and said second portions is activated for transmitting said output signals,
  means for connecting said input portion to said output portion whereby said input signals become output signals, and
  system controller means for activating said primary or secondary portions,
  said input portions further including elastic store means for storing said data samples,
  clock recovery means connected to receive said data samples for providing a clocking edge lagging the data bit for each of said samples,
  read/write control means,
  address select means responsive to said read/write control means for selecting the location in said elastic store means into which said data bit is to be written,
  write address counter means and read address counter means connected to said address select means for specifying the address at which data is to be written into or read from said elastic store means, serial to parallel converter means connected to said elastic store means for converting said serial data samples to parallel samples, reframe control means connected to said read address counter for clocking said data samples from said elastic store to said converter means, and output buffer means for connecting said parallel samples to one of said time slot interchangers specified by said system controller means.

25. An integrated message accounting system operating in time frames each having a plurality of time slots, said system operating to switch data samples between a time slot on one communication line and a time slot on another communication line, where the samples occur as serial bits in said time slots, comprising:

line group means including
  a number of primary and secondary input portions for receiving input data signals where one or the other of said primary and secondary input portions is activated for receiving said input signals,
  a number of primary and secondary output portions equal to said input portions for transmitting output signals where one or the other of said primary and secondary output portions is activated for transmitting said output signals, time slot interchanger means for connecting said nput portion to system controller means for activating said primary or secondary portions, said input portions further including elastic store means for storing said data samples, clock recovery means connected to receive said data samples for providing a clocking edge lagging the data bit for each of said samples, read/write control means, address select means responsive to said read/write control means for selecting the location in said elastic store means into which said data bit is to be written, write address counter means and read address counter means connected to said address select means for specifying the address at which data is to be written into or read from said elastic store means, serial to parallel converter means connected to said elastic store means for converting said serial data samples to parallel samples, reframe control means connected to said read address counter means for clocking said data samples from said elastic store to said converter means, and output buffer means for connecting said parallel samples to one of said time slot interchangers specified by said system controller means.

26. An integrated message accounting system operating in time frames each having a plurality of time slots where each of said time frames includes a framing bit for identifying each frame in a multiframe format, said system operating to switch data samples between a time slot on one communication line and a time slot on another communication line, where the samples occur as serial bits in said time slots on said lines, comprising:

line group means including
  a number of primary and secondary input portions for receiving input data signals where one or the other of said primary and secondary portions is activated for receiving said signals,
  a number of primary and secondary output portions equal to said input portions for transmitting output signals where one or the other of said primary and secondary output portions is activated for transmitting said output signals, time slot interchanger means for connecting said input portion to said output portion whereby said input signals become output signals, system controller means for activating said primary or secondary portions, master clock means for activating said primary or secondary line group means and said time slot interchangers, said master clock means including means for generating a clock signal equal to twice the data rate of said data samples and means for generating a frame bit signal identifying each of the frames of said multiframe format, said input portions including data selector means activated by said system controller means for receiving said data samples, elastic store means for storing said samples, clock recovery means connected to receive said data samples for providing a clocking edge lagging the data bit for each of said samples, read/write control means, address select means responsive to said read/write control means for selecting the location in said elastic store means into which said data bit is to be written, write address counter means and read address counter means connected to said address select means for specifying the address at which said data bit is to be written into or read from said elastic means, serial to parallel converter means connected to said elastic store means for converting said serial data samples to parallel data samples, reframe control means connected to said read address counter for clocking said data samples from said elastic store to said converter means, output buffer means for connecting said parallel samples to one of said time slot interchangers specified by said system controller means, said reframe control means including processor means for comparing once per frame said frame bit with said master clock frame bit whereby said reframe control means synchronizes the incoming frame bit to the nearest clock frame bit.

27. In a telephone system operating in a multitime frame format, each frame having a plurality of time slots, said system operating to switch data samples between said time slots where the samples occur as serial data bits at a predetermined rate, line group apparatus comprising:

data selector means for receiving input data samples, elastic store means for storing said data samples, clock recovery means connected to receive said data samples for providing a clocking edge lagging the data bit for each of said samples, read/write control means, address select means responsive to said read/write control means for selecting the location in said elastic store means into which said data bit is to be written, counter means connected to said address select means for specifying the address at which data is to be written into or read from said elastic store means, serial to parallel converter means connected to said elastic store means for converting said serial data samples to parallel samples, and reframe control means connected to said counter means for clocking said data samples from said elastic store means to said converter means.

28. An integrated message accounting system operating in a multiple frame format, each frame having a plurality of time slots, said system operating to switch data samples between time slots on a plurality of multitime slot input and output digital data buses, comprising:

line group means including
a number of primary and secondary input portions for receiving input data samples on said input buses where one or the other of said primary or secondary input portions is activated for receiving said input samples,
a number of primary and secondary output portions for transmitting output data samples on said output buses where one or the other of said primary or secondary output portions is activated for transmitting said output data samples, a second number of time slot interchangers for connecting said active input portions to said active output portions where one of said interchangers is activated for connecting said input portions to said output portions whereby said input samples become output samples, system controller means for activating said primary or secondary portions in one of said interchangers wherein said system controller means include
a primary system controller for activating said primary portions of said line group means and one of said time slot interchangers, and
a second system controller for activating said secondary portions of said line group means and one of said time slot interchangers, where one of said primary or secondary system controllers is in an active state and said other controller is in a standby state, primary service generator means connected to said primary portions and second service generator means connected to said secondary portions for connecting selected service tone signals to selected time slots specified by said system controller means, primary signal processor means connected to said primary portions and secondary signal processor means connected to said secondary portions, said signal processor means responsive to said system controller means for detecting changes of state of supervisory signals for each of said time slots where said supervisory signals occur as signaling bits during a signaling frame of said multiframe format, and for sending supervisory signals in specified ones of said time slots, primary multifrequency sender means connected to said primary portions and secondary multifrequency sender means connected to said secondary portions, said sender means responsive to said system controller means for sending multifrequency signals in selected time slots specified by said system controller means, primary multifrequency receiver means connected to said primary portions and secondary multifrequency receiver means connected to said secondary portions for detecting the presence of multifrequency tone signals in time slots specified by said system controller means.

* * * * *